United States Patent [19]

Namngani

[11] Patent Number: 5,594,414
[45] Date of Patent: Jan. 14, 1997

[54] COLLISION PROBABILITY DETECTION SYSTEM

[76] Inventor: Abdulatif Namngani, P.O. Box 13925, Jeddah 21414, Saudi Arabia

[21] Appl. No.: 284,114

[22] Filed: Aug. 2, 1994

[51] Int. Cl.⁶ ..................................................... B60Q 1/00
[52] U.S. Cl. .......................... 340/436; 340/435; 340/903; 340/904; 340/901; 180/168; 180/171; 364/461
[58] Field of Search ................................... 340/436, 435, 340/903, 904, 901; 180/168, 171; 364/461

[56] References Cited

U.S. PATENT DOCUMENTS

| | | | |
|---|---|---|---|
| 3,689,882 | 9/1972 | Dessailly | 340/53 |
| 4,543,577 | 9/1985 | Tachibana et al. | 340/904 |
| 4,621,705 | 11/1986 | Etoh | 180/169 |
| 4,670,845 | 6/1987 | Etoh | 364/461 |
| 4,706,195 | 11/1987 | Yoshino et al. | 364/426 |
| 4,757,450 | 7/1988 | Etoh | 364/426 |
| 4,833,469 | 5/1989 | David | 340/901 |
| 5,053,979 | 10/1991 | Etoh | 364/565 |
| 5,091,726 | 2/1992 | Shyu | 340/904 |
| 5,165,497 | 11/1992 | Chi | 180/169 |
| 5,355,118 | 10/1994 | Fukuhara | 340/436 |
| 5,357,438 | 10/1994 | Davidian | 364/461 |

*Primary Examiner*—Jeffery Hofsass
*Assistant Examiner*—Daryl C. Pope
*Attorney, Agent, or Firm*—Bacon & Thomas

[57] ABSTRACT

An accident alarm system continuously assesses the potential for a collision between a host vehicle and an object, based solely on input signals representative of the host vehicle velocity and the distance to the object measured at intervals at time t, by first assessing the status of the host vehicle to determine whether it is moving with constant velocity, stationary, accelerating, or decelerating, and then carrying out different signal processing routines to determine, as necessary, whether the object is moving with constant velocity, stationary, accelerating, or decelerating, the magnitude of the host vehicle and object accelerations, and the direction of movement of the object. Warning signals are generated based on these determinations, which assume that the vehicle and object will continue to possess the same acceleration or deceleration until a collision occurs. The system can also be used to activate additional safety devices by performing additional determinations as to whether a severe collision is imminent.

22 Claims, 38 Drawing Sheets

COLLISION PROBABILITY DETECTION SYSTEM

BACKGROUND OF THE INVENTION

1. Field of the Invention

This invention relates to an electrical device carried by a vehicle. The electrical device processes input signals representative of (1) the velocity of the vehicle, and (2) the distance from the vehicle to a stationary or moving object (including another vehicle), in order to obtain an output signal representative of the probability of a collision between the vehicle and the object. The invention also relates to a method by which the electrical device processes the velocity and distance input signals, in order to obtain an output signal representative of the probability of a collision between the vehicle and the object.

2. Description Of Related Art

A variety of systems have been proposed in recent years for warning the operator of a vehicle of a potential collision and, if necessary, triggering automatic safety devices such as airbags and extendable bumpers based on the probability that a collision will occur. Given a suitable "front end," i.e., a device for detecting and measuring the existence to a potential obstacle, this would appear to be a relatively trivial problem since the equations of motion which govern the dynamic behavior of moving objects has been known for centuries. However, the fact that a need for such systems still exists indicates that the problem is not trivial, despite the availability of inexpensive and reliable optical and radio frequency range finders suitable for use as front ends in a collision avoidance or warning system. While the equations of motion are well-known, the manner in which these equations have been applied has greatly varied, and always with disappointing results.

Prior collision avoidance or warning systems range from extremely sophisticated doppler and/or tracking radar systems and automatic pilots which use artificial intelligence to guide military attack aircraft over rough terrain at supersonic speeds, to systems which simply monitor the distance to an object and provide a warning when a threshold minimum distance is detected. The more sophisticated systems are at present too complex and costly for general purpose civilian applications, while simpler systems have heretofore provided too little meaningful information to be useful. Despite extensive research programs by automobile manufacturers and others, and the demonstrated capabilities of the more sophisticated collision avoidance systems, particularly in aircraft, none of the previously proposed systems has proven adequate for use in automobiles and other passenger vehicles.

In order to be useful, an automotive collision avoidance or warning system must be relatively inexpensive, and yet be capable of providing meaningful warnings in all situations which might be encountered by the operator of the vehicle, while minimizing the possibility of false alarms. No such system currently exists.

SUMMARY OF THE INVENTION

It is accordingly an objective of the invention to provide a collision avoidance or warning system which is easily implemented and yet provides meaningful warnings in all situations which might be encountered by the operator of a vehicle, with a minimum of false alarms.

More particularly, it is an objective of the invention to provide a practical apparatus which utilizes available object detection and range finding devices to generate a real time signal giving the probability of a collision between a vehicle and an object, based solely on input signals representative of the velocity of the vehicle and the distance of the object from the vehicle, and which uses relatively inexpensive processing components.

It is also an objective of the invention to provide a method by which an electrical device can process velocity and distance input signals in real time to obtain an output signal representative of the probability of a collision between the vehicle and the object.

It is a further objective of the invention to provide a collision warning system which requires as an external input only a range finding or distance measuring sensor, positioned to face either the front or rear of the vehicle, or both front and rear, but in which scanning is not requirement, and yet in which information is processed and results obtained in real-time using inexpensive digital processing circuitry.

It is a still further objective of the invention to provide a collision avoidance system which supplies sufficient useful information to the vehicle operator to avoid collisions but does not attempt to supply more information than necessary, using only a series of warning lights to convey to the operator of the vehicle all of the information needed to take appropriate actions without requiring the operator to spend more time than necessary interpreting and evaluating the information.

These objectives are accomplished, in summary, by providing a system which continuously assesses the potential for a collision between a host vehicle and an object, based solely on input signals representative of the host vehicle velocity and the distance to the object measured at intervals at time t, by first assessing the status of the host vehicle to determine whether it is moving with constant velocity, stationary, accelerating, or decelerating, and then carrying out different signal processing routines to determine, as necessary, whether the object is moving with constant velocity, stationary, accelerating, or decelerating, the magnitude of the host vehicle and object accelerations, and the direction of movement of the object. Warning signals are generated based on these determinations, which assume that the vehicle and object will continue to possess the same acceleration or deceleration until a collision occurs. Changes in the acceleration or path of the host vehicle and object are accounted for without the need for complex calculations by updating the host velocity and distance information at sufficiently short intervals, permitted by the simple calculations involved. The system can also be used to activate additional safety devices by performing additional determinations as to whether a severe collision is imminent.

The approach taken by the present invention is to utilize a simple front end, in the form of a sensor capable of providing to a controller a signal representative of the distance to an object in the field of view of the sensor, and to process this signal together with a signal provided by the velocity sensor of the host vehicle on which the subject electrical device is mounted, such as the speedometer of an automobile, to determine the relative speed and acceleration first of the host vehicle and then, as necessary, of the object detected, and to linearly extrapolate based on the current distance, velocity, and acceleration whether, if the detected velocities and accelerations of the host vehicle and object do not change, the paths of the host vehicle and object will intersect.

This approach has the advantage that the more complex calculations required to determine the velocity and especially the acceleration of the object can be avoided in most instances. In addition, by performing linear extrapolation of the acceleration and velocity results for the vehicle and object without attempting to otherwise determine the nature of the object or predict its future behavior, while at the same time repeating the base distance and host vehicle velocity measurements at sufficient short intervals, analysis of the results of the velocity and acceleration determinations reduces to a few simple warning signal generating routines, easily implemented in either hardware or software, although the preferred implementation is a hardware implementation.

As in the most basic of the previously proposed systems, the system of the invention assumes that there will be no changes in the behavior of the vehicle or object during the interval between measurements. While systems which attempt of predict the behavior of the vehicle or object after a predetermined interval may theoretically have a greater potential for accuracy, in practice the increased time interval between measurements actually decreases the accuracy of the system in comparison with a system in which simplified calculations are used, but in which measurements can be taken more frequently. Nevertheless, unlike the previously proposed linear systems, the present system is capable of distinguishing between degrees of danger in all possible situations where a collision is possible.

To accomplish this, the invention provides an apparatus or electrical device made up of signal processing circuitry arranged to first check, based on the host vehicle velocity input signal, one of four conditions: (1) whether the host vehicle is stationary, (2) whether it is moving with constant velocity, (3) whether it is accelerating, or (3) whether it is decelerating. Based on this determination, the circuitry then invokes one of a plurality of different signal processing routines to make various appropriate determinations of the status (distance to, velocity, and acceleration) of the object in the field of view of the sensor, and generates as a result a signal which either activates a warning or safety device, or indicates that there is no imminent danger of collision with the object. These determinations are as follows:

(1) Host Vehicle Stationary

When the host vehicle is stationary, the determinations involve checking the distance moved by the object during successive time intervals to determine whether the object is moving towards or away from the host vehicle with either deceleration, acceleration, or constant velocity. In the case where the object is moving towards the host vehicle with either acceleration or constant velocity, a warning is issued because, if the object continues along the same trajectory, a collision is imminent. In the case where the object is moving towards the host vehicle with deceleration, the system calculates amount of deceleration and from that the stopping distance and determines whether the object will stop, at the detected deceleration, in sufficient time to avoid colliding with the host vehicle. If the host vehicle is stationary and the object is moving away from the host vehicle with either deceleration, acceleration, or constant velocity, then there is of course no danger of a collision While these determinations may seem obvious in hindsight, those skilled in the art will appreciate that there are numerous other ways of attempting to determine whether an object detected by a range finding sensor will collide with a stationary host vehicle, such as by attempting to calculate the rate of change of deceleration in order to obtain a more accurate estimation of the dynamic behavior of the object and the collision potential. This would greatly increase the complexity of the system without adding to its effectiveness because, in the preferred system, the calculations are simple enough that the information can be updated rapidly enough to make up for changes in the status of the object without the need for added calculational complexity. Alternatively, in a simpler system, the movement of the object towards the host vehicle might be taken into account without also taking into account the deceleration and stopping distance, resulting in an unnecessary warning. The preferred system thus achieves a balance between computational complexity and the amount of information provided.

(2) Host Vehicle Moving With Constant Velocity

In the situation where the host vehicle is moving with constant velocity, the system determines whether the object is moving relatively towards or away from the host vehicle. If the object is moving towards the host vehicle in this situation, whether it is moving with constant velocity, deceleration, or acceleration, or not moving, a warning is appropriate and the system is free to update the host vehicle velocity measurement and process another distance sample from the range finding sensor. However, if the object is moving in the same direction as the host vehicle, then the system determines whether it is accelerating, moving with a constant velocity, or decelerating. If it is accelerating, the preferred apparatus determines the time the object will take to exceed the velocity of the host vehicle and the amount by which the relative distance between the host vehicle and the object will change during this time. If the change is more than the distance between vehicles, then a collision will occur if nothing changes. If the object is moving with constant velocity, the preferred apparatus simply needs to determine which velocity is greater in order to determine whether a collision will occur (while the relative difference in velocities is relevant to the severity of the danger, and therefore to the type of warning, it is not necessary to the determination of whether a collision will occur). If the object is decelerating, then no further determinations need to be made decide whether a collision will occur since eventually the host vehicle will overtake the object.

As with the host vehicle stationary situation, those skilled in the art will appreciate that while the calculations involved in determining the velocity, acceleration, and relative distance to the object involve basic physical formulas, and therefore might be considered obvious, the timing of the calculations or determinations only after first determining that the host vehicle is moving with a constant velocity, and the particular determinations made at that time (object moving towards or away from the host vehicle and, in the latter case, whether the object is moving with constant velocity, accelerating, or decelerating) are unique. This is of course also true with respect to the host vehicle accelerating and decelerating situations which make up the other two main branches by which the preferred apparatus performs the signal processing which results in the generation of appropriate warning signals.

(3) Host Vehicle Accelerating

When the host vehicle is accelerating, then the determination of whether a collision will occur depends only on whether the object is accelerating an amount which is sufficient to cause the object to reach the host vehicle velocity before the relative distance between the host vehicle and the object reduces to zero, and thus the preferred apparatus makes a determination of the time it will take the object to reach the host vehicle velocity, and the distance change which will occur during this time. If the object is not accelerating, then a collision will inevitably occur.

(4) Host Vehicle Decelerating

When the host vehicle is decelerating, then a determination of the change in relative distance must be made for the situations where the object is 1.) decelerating toward the host vehicle, 2.) decelerating in the same direction as the host vehicle, 3.) moving with constant velocity in the same direction as the host vehicle, or 4.) accelerating in the same direction as the host vehicle. In situations 1 and 2, a determination of host vehicle stopping distance is made and the stopping distance is compared with the amount by which the relative distance between the host vehicle and the object will change before the host vehicle stops. In situation 3, the preferred apparatus makes a determination of the change in relative distance which will occur during the time it takes for the host vehicle to decelerate to a velocity which is less than that of the object, while in situation 4, the preferred apparatus determines the change in relative distance which will occur during the time it will take for the object to exceed the host vehicle velocity.

Those skilled in the art will appreciate that each of the determinations made above for host vehicle conditions (1)–(4), while unique and optimized in terms of efficiency of processing, may nevertheless be subject to variation by those skilled in the art, and thus should be included within the scope of the invention. For example, in the situations where the host vehicle is decelerating and the object is moving with a constant velocity, those skilled in the art may wish to make a determination of the stopping distance of the object and compare it with the change in relative distance between the host vehicle and the object during the time it takes the host vehicle to stop, rather than making a determination of the host vehicle stopping distance and the time it will take the object to stop, since the two determinations are essentially equivalent, and each should therefore be included within the scope of the invention. On the other hand, the basic principles of dividing the host vehicle behavior into four categories, and making subsequent determinations using only necessary calculations and comparisons equivalent to those outlined above in order to linearly extrapolate the paths of the host vehicle and object, while relying on the ability of the apparatus to update the input information represented by the input signals in real time to avoid the need for more complex calculations and yet still provide appropriate warnings in all situations, may be considered essential to the invention (subject to any broadening definitions supplied by the claims appended below in order to prevent others from inequitably misappropriating any portion of the invention). The elements of the invention outlined above provide the basis for a device, and method of operating the device, which offers a balance between simplicity and effectiveness heretofore unimagined in the art of collision avoidance and/or warning.

The manner of operation of the invention may be summarized as follows. Based on a single external input in the form of a distance measurement, together with a signal from the velocity sensor of the vehicle, the preferred apparatus monitors the status of the vehicle to determine whether it meets any one of the following four conditions:
1. Moving with constant velocity.
2. Moving with acceleration.
3. Moving with deceleration.
4. Not moving, and then determines as appropriate the status of any object detected by the distance sensor, based on the following object parameters:
1. In which direction it is moving,
2. Whether it is moving with constant velocity
3. The magnitude of the velocity,
4. Whether it is moving with acceleration,
5. How much the acceleration is,
6. Whether it is moving with deceleration,
7. How much the deceleration is, or
8. Whether it is stationary.

This information is used to predict the probability of an occurrence of an accident and, in the preferred embodiment of the invention, provide the vehicle operator with warnings designed to focus the operator's attention on the detected conditions while allowing the operator to reject the warnings or take appropriate steps. If the operating does not take sufficient steps to avoid a collision, the velocity of the host vehicle is high compared to that of the object, and the distance is sufficiently small, then the preferred system is capable of activating automatic collision avoidance or safety devices.

The warnings are designed so as to avoid all accidents involving reasonably unimpaired operators can be avoided, in particular, those caused by temporary operator inattention, by providing two signals for indicating the relative hazards associated with the probabilities determined in the above described steps. The two signals are designated below by the letters G for a "green light" or safe condition (in which all warning lights are deactivated or a green light is on), and R for a "red light" condition in which a warning light of any desired color, with or without an audible alarm, is activated. The same signal which activates the warning could also be used to activate a safety device, such as an extendable bumper, by including and additional processing routine for comparing the relative velocities of the host vehicle and object, since the difference in velocities is the major factor in determining the severity of a collision, and for monitoring the distance between the host vehicle and the object to determine imminence. The additional processing routine for taking action in addition to activation of a warning device or alarm is preferably implemented by separating the warning signal generating procedure into four different warning signal generating subroutines, which perform various additional tests depending on the conditions under which they were called, before activating any automatic collision avoidance or safety devices in order to prevent the dangerous situation in which the safety devices are activated prematurely. These warning devices would of course only be activated as a last resort, and should not be necessary so long as the operator of the vehicle is sufficiently unimpaired to heed the warnings which will be given, if possible, well before activation of the safety devices is necessary.

DETAILED DESCRIPTION OF THE PREFERRED EMBODIMENTS

Figure 1:
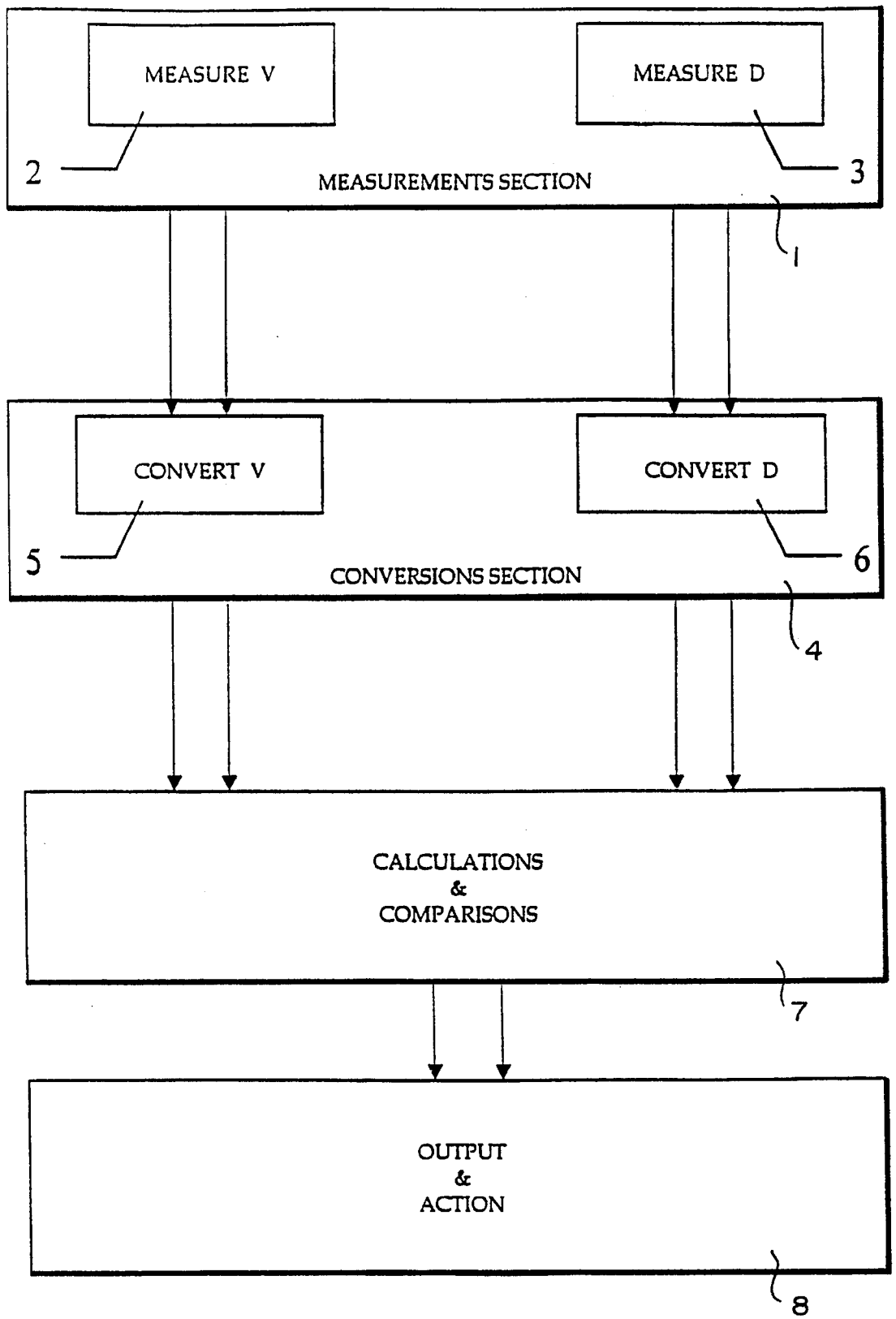
FIG. 1 is a functional block diagram of the principal components of an electrical device constructed in accordance with the principles of the preferred embodiment of the invention.

FIG. 1 shows a single collision detection and processing unit constructed in accordance with the principles of a preferred embodiment of the invention. In practice, a vehicle will be equipped with a plurality of the illustrated processing units, both in front and at the rear of the vehicle, but all of the units are essentially identical, so only a single unit is described herein. Each of the detection and processing units operates independently and includes four sections, as follows:

Measurements Section

The first section is a measurements section 1 for monitoring the velocity of the host vehicle and the distance between the host vehicle and an object external to the vehicle.

A velocity sensor 2 is attached to the vehicle velocity indicator or speedometer (not shown). In the case of an electronic speedometer, the velocity may be directly input to the velocity sensor 2 or, in the case of a mechanical speedometer device, a transducer may be attached to convert the mechanical indication into electronic form suitable for input to the velocity sensor. Those skilled in the art will easily be able to implement such a device using techniques commonly known in the velocity sensing art.

The distance measurements may be in the form of radar, laser, sonar, or the like located at a fixed point on the vehicle, for example on the bumper of the vehicle if the vehicle is an automobile. Preferably, in the case of sensing devices located on the bumper, one sensing device is located at the left side, one at the middle, and one at the right side, with corresponding sensors on the rear bumper. Numerous such distance measuring devices are also known to those skilled in the art, including a number of sensing devices which have adapted for use on motor vehicles. In general, such devices are designed to provide an electrical signal indicative of the distance to the any object situated in the path of the measuring beam, whither in the form of radar, laser, or sonar energy, although if processing of the signal is required in order to render it in a form suitable for use by the claimed invention, those skilled in the art will easily be able to do so using conventional signal processing techniques.

Conversions Section

Both the velocity measuring sensor 2 and the distance measuring sensor 3 provide, in the illustrated embodiment, analog signals. The second section of each unit is a conversions section 4, made up of a circuit which receives the analog signals representative of velocity and distance which have been measured in the measurement section, and digitizes them. Those skilled in the art will appreciate, however, that the sensors may have outputs which are already in digital form, and this section may in some circumstances be omitted or used solely for analog-to-digital conversion of just one of the sensor inputs. In addition, those skilled in the art will appreciate that the disclosed circuitry may alternatively be implemented in analog form, although for reasons of convenience and availability of suitable processors, digital implementation is currently preferred. In either case, the processing circuitry which follows this stage, whether specially designed to implement the disclosed method steps, or in the form of more general purpose computing devices "programmed" to implement the disclosed steps, processes the electrical signals received from the sensors, modifying them to generate outputs in the form of electrical signals capable of either activating warning devices, or even collision avoiding apparatus.

Calculations and Comparisons Section

The calculations and comparisons section 7 of the preferred apparatus receives digitized signals from the respective host velocity and distance sensors 2 and 3 (with the vehicle velocity in appropriate units of, for example, meters per second or yards per second, and the distance d in appropriate units such as meters or yards), after conversion of the analog output signals to digital signals by the conversions section 4, and processes the digital signals to check if there is a possibility for a collision or accident. The output of this section is an electrical signal having a magnitude or value which represents the probability of a collision between the host vehicle and a particular object detected by the distance sensor, as will be described in more detail below in connection with the flowchart of FIGS. 2–38.

Calculations and collisions section 7 is preferably in the form of a microprocessor which may be specifically designed or wired to perform the processing steps described below, although on of a number of commercially available microprocessor can arranged to perform those steps. In addition, a memory is required to store signals representing the variables used during the processing, and in particular the initial distance and velocity input signals, as well as signals representative of the four vehicle states described below, and the object velocity and acceleration if required. This memory may be in the form of a RAM, although internal registers of the processor or other shift registers or latches may used as appropriate.

Output and Action Section

The output and action section 9 receives the electrical signal output by the calculations and comparisons section and supplies this signal to an indicator capable of being perceived by the operator of the vehicle or, optionally, to apparatus for automatically taking action in the event that the probability of collision is too high and immediate for the operator to react in time to prevent the collision. Although not shown, the indicator may be in the form of LEDs of appropriate colors, in combination with an audible if desired. The apparatus for automatically taking action can take a variety of forms, including active passenger protection systems, as well systems for automatically activating bumpers, brakes, and other systems on the vehicle. The specific form of the apparatus or indicators activated forms no part of the present invention, however, and those skilled in the art will understand that the signal output by the controller according to the method described below can be used in a variety of ways while still remaining within the scope of the invention.

"Variables" and Equations

In the calculations and comparisons section, the following variables, defined by equations, are conveniently used during processing. Each of these variables represents a digital electrical signal whose magnitude changes according to changes in the values of the electrical signals representing the other variables, and ultimately according to changes in the input signals from the conversion section:

S is absolute distance traversed by the object in an interval of time t;

$v_o$ is the object velocity at the beginning of an interval of time t;

$v_f$ is the object velocity at the end of the interval of time t;

a is the object absolute acceleration in an interval of time t;

$a_1$ is the object absolute acceleration during a first interval of time $t_1$;

$a_2$ is the object absolute acceleration during a second interval of time $t_2$;

$a_2$ is the average acceleration of the object during the two intervals of time $t_1$ and $t_2$; and v is the object constant velocity (if the object is moving at a constant velocity).

The variables S, $v_o$, $v_f$, a, and t are related by the following well-known equations of motion. It will be appreciated that while the preferred system utilizes these equations, as does any system which measures or controls dynamic characteristics of a moving object, the equations themselves form no part of the invention:

$$S = v_o t + \tfrac{1}{2} a t^2;$$

$$v_f = v_o + at;$$

$$a_v = [a_1 + a_2]/2; \text{ and}$$

$$S = vt.$$

In order to determine the object acceleration a, the preferred apparatus uses intermediate variables representative of the distance travelled by the host vehicle during the time interval t, the acceleration or deceleration of the host vehicle if it is accelerating or decelerating, and the host vehicle's velocity if it is moving with a constant velocity. The distance travelled by the host vehicle and the change in relative distance between the host vehicle and the object are then used to determine the status of the object, based on which, together with the status of the vehicle, the preferred system can output an electrical signal which represents the probability of the occurrence of an accident. A variety of other intermediate variables are used during processing of the initial inputs, as will become apparent from the following detailed description of the functions and manner of operation of the preferred apparatus.

It is important to note that the use of the term "variables," and the descriptions in the form of equations, are intended as a shorthand which those skilled in the art will understand to refer to the operation of the numerous transistors, capacitors, and other circuit elements which make up the calculation and conversion section. Although the circuitry is extremely complex, the state-of-the-art of signal processing is such that those skilled in the art will easily be able to implement the invention, but to the contrary will be able to implement the illustrated method steps based solely on the description of the higher level principles set forth herein, leaving details of circuit development to commercial manufacturers of the circuitry used if the processor is an off-the-shelf processor, to a technician, or even to a CAD program or the like. In the case where an off-the-shelf processor is used, by controlling the processor using "software," those skilled in the art will understand that the software functions in this case to set the various switches, latches, and other circuitry which makes up the commercial processor, that the configuration of these circuit elements is thus unique to the present invention, that the structural arrangement of circuit elements resulting from this configuration physically changes any signals passing therethrough, and that these changes result in the generation of a unique output signal which can then be used to control the warning lights or other devices.

The following sections detail the procedure by which the hardware (whether in the form of dedicated circuitry or an off-the-shelf processor configured by "software" as described above) processes the input signals and obtains a signal representative of the probability of a collision between the host vehicle in which the apparatus is situated and an object in the field of view of a sensor located at the front of the host vehicle. It will be appreciated by those skilled in the art that, while a description of the procedures followed when the sensor is located at the rear of the vehicle has been omitted, the procedures for the rear sensor will be analogous to those described with respect to the front sensor, except that the number of hazard situations will decrease. Also, it will be necessary to provide procedures or hardware for distinguishing the closest object or objects and only perform the collision probability assessments for those objects.

Main Control Procedure-Determination of Host Vehicle Status

Figure 2:
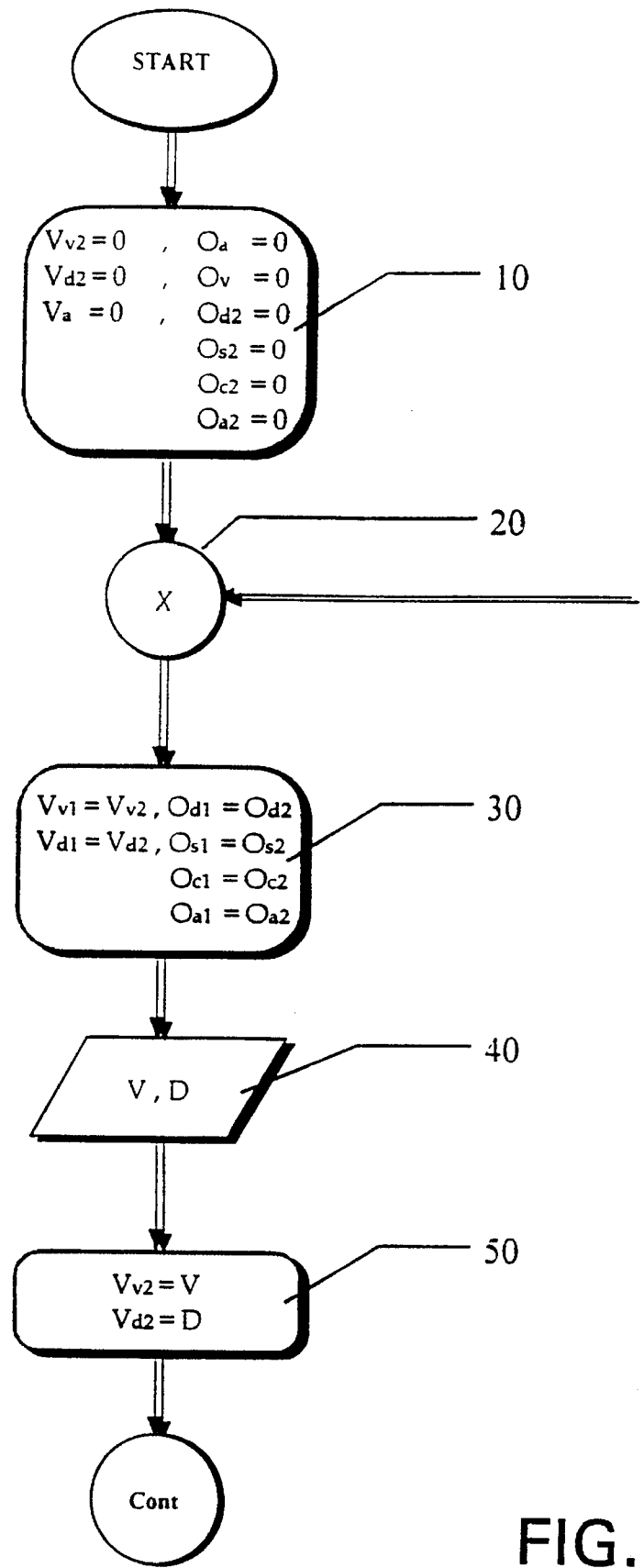
FIGS. 2–38 make up a flowchart illustrating the operation of a front side warning system in accordance with the principles of a preferred embodiment of the invention.
Figure 3:
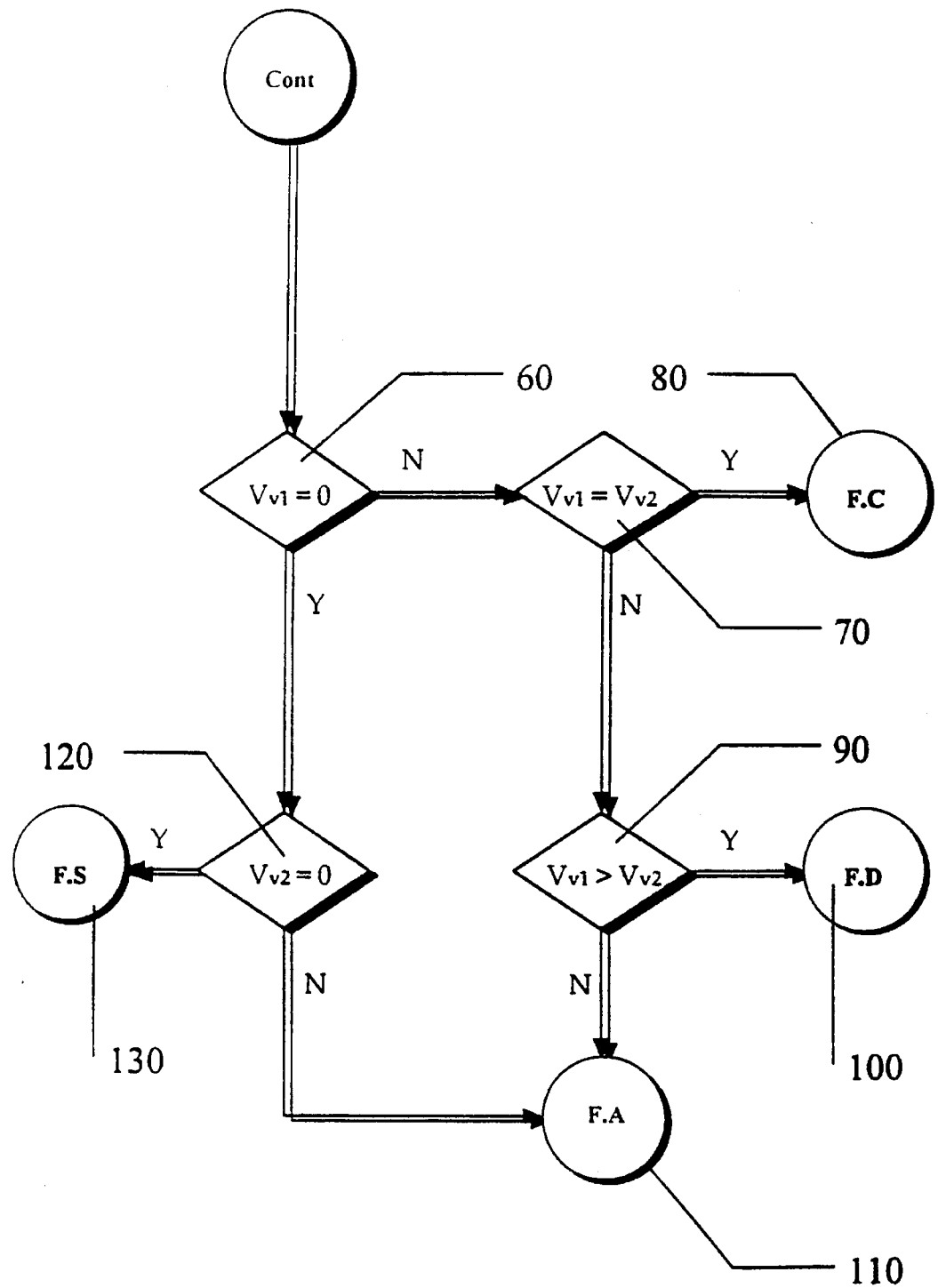

The main control procedure, shown in FIGS. 2 and 3, determines whether the host vehicle is (1) moving with constant velocity, (2) decelerating, (3) stationary, or (4) if none of the first three conditions is found, accelerating.

As shown in FIG. 2, the first step 10 in the preferred method of implementing the invention is to initialize variables $v_{V2}$, $v_{D2}$, $v_a$, $v_{C2}$, $O_a$, $O_V$, $O_{D2}$, $O_{S2}$, $O_{C2}$, and $O_{a2}$ whose present values will be determined in the steps described below. $v_{V2}$ represents the velocity of the host vehicle during the current time interval $t_2$, $v_{D2}$ represents the distance measured between the host vehicle and the object during the current time interval, $v_a$ represents the host vehicle acceleration, $v_{C2}$ represents a temporary variable used for storing the distance moved by the host vehicle during calculation of the velocity of the host vehicle $O_a$ is the calculated acceleration of the object over successive time intervals, $O_V$ is used to represent the object constant velocity, if applicable, $O_{D2}$ is a variable representing the current measured distance between the object and the host vehicle, $O_{S2}$ represents the distance moved by the object during the current time interval, $O_{C2}$ is a temporary variable used for storing the distance moved by the object during calculation of the acceleration of the object, and $O_{a2}$ represents the acceleration of the object during the current time interval. Step 20 in the flowchart is the return point for values after the completion of one iteration, i.e., one interval of time t. The values returned, $v_{V2}$, $V_{D2}$, $O_{D2}$, $O_{S2}$, $O_{C2}$, and $O_{a2}$, are then used as the corresponding initial values $v_{V1}$, $V_{D1}$, $O_{D1}$, $O_{S1}$, $O_{C1}$, and $O_{a1}$ for the next iteration (step 30), after which the host vehicle velocity is read and the signal representative of the distance between the host vehicle and the object is sampled. The host vehicle velocity v sampled at this time is the vehicle velocity at the end of the interval for the iteration, and therefore is stored in the memory area assigned to variable $v_{V2}$ while signal representative of the distance measured to the object is stored in the memory area assigned to variable $V_{D2}$ (step 50).

In step 60, shown in FIG. 3, the system determines whether the vehicle was moving at the beginning of the interval, based on the value of $v_{V2}$ (those skilled in the art will appreciate that, whenever a variable is mentioned herein, the variable is actually in the form of a memory location assigned to the variable and in which an electrical signal (or analogous magnetic, biological, or chemical signal, depending on the type of memory) is stored. If the vehicle was moving, then in step 70, the system compares the variables representative of the vehicle velocity at the beginning and end of the interval to determine if the vehicle was 1.) moving at a constant velocity during the interval (step 70), at which time a constant velocity subroutine is called (step 80—see FIG. 4), 2.) with decreasing velocity (step 90), at which time a decreasing velocity subroutine is called (step 100—see FIG. 18), or 3.) with increasing velocity (also step 90), at which time an increase in velocity subroutine is called (step 110—see FIG. 9). In the case where the vehicle was not moving at the beginning of the interval, then the system only needs to check the value of the final velocity variable (step 120), since the vehicle cannot decelerate from zero velocity. If the vehicle has not moved during the interval, then the system proceeds to a stationary vehicle subroutine (step 130—see FIG. 15). Otherwise, it proceeds to the increasing velocity subroutine shown in FIG. 9 (step 110).

(1) Host Vehicle Moving With Constant Velocity

Figure 4:
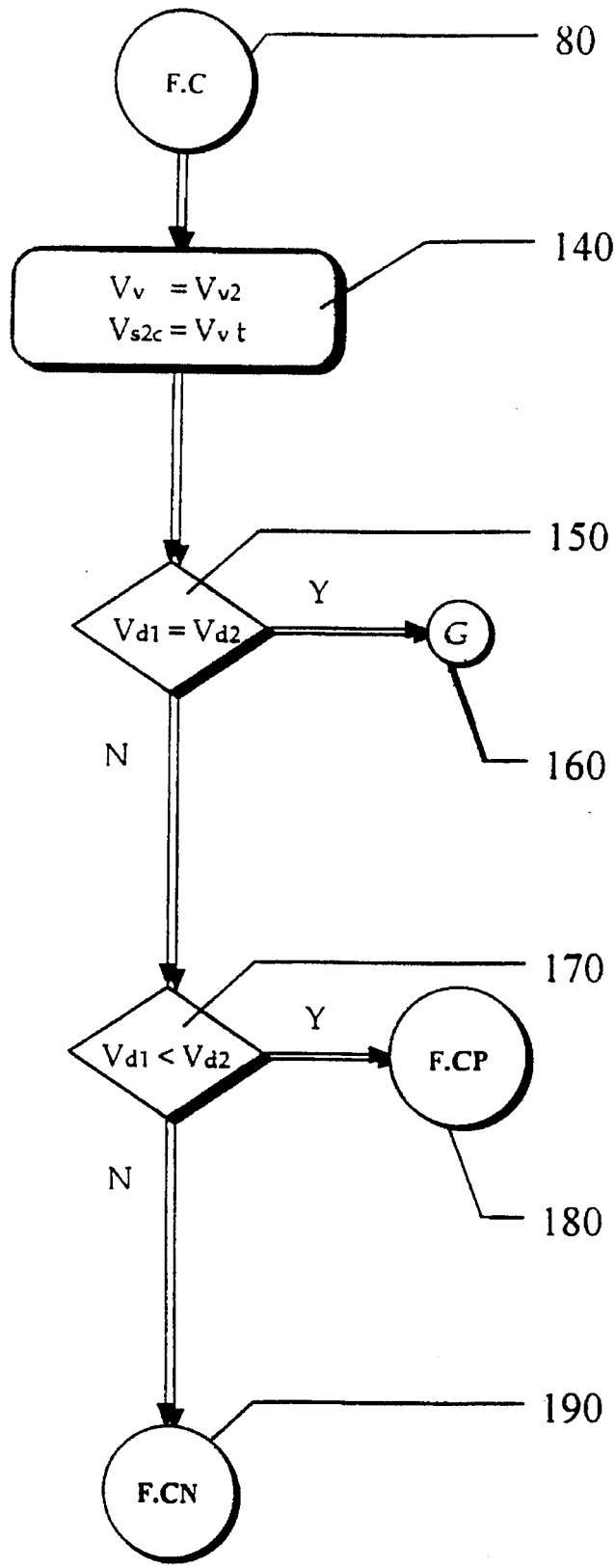

As shown in FIG. 4, the distance moved by the host vehicle during the time interval t is determined by multiplying the constant velocity by the time interval (i.e., by retrieving and combining the digital signals stored in the memory locations assigned to the variables in question in a shift register or the like to obtain a further digital signal representative of the product of the values of the variables) (step 140).

Next, the measured distances at the beginning and end of time interval t, $v_{D1}$ and $V_{D2}$ are compared (step 150) and if the distances are the same, then the system outputs a signal G which either deactivates the warning lights and other indicators or activates an indicator which represents a safe or no collision situation (step 160). If the distance is increasing, as determined by step 170, however, then the object in front of the vehicle is getting farther because it is either 1.) moving in the same direction as the host vehicle but with a higher velocity, 2.) moving in the same direction and accelerating, or 3.) moving in the same direction with a higher but decreasing velocity. These items are tested in the subroutine called in step 180 (see FIG. 5). On the other hand, if the distance is decreasing, the vehicle in front may be either 1.) not moving, 2.) moving in the same direction but accelerating, 3.) moving in the same direction with constant velocity, 4.) moving in the same direction and decelerating, or 5.) moving in the opposite direction with acceleration, constant velocity, or deceleration. These items are tested for in the subroutine called in step 190 (and shown in FIG. 6).

Figure 5:
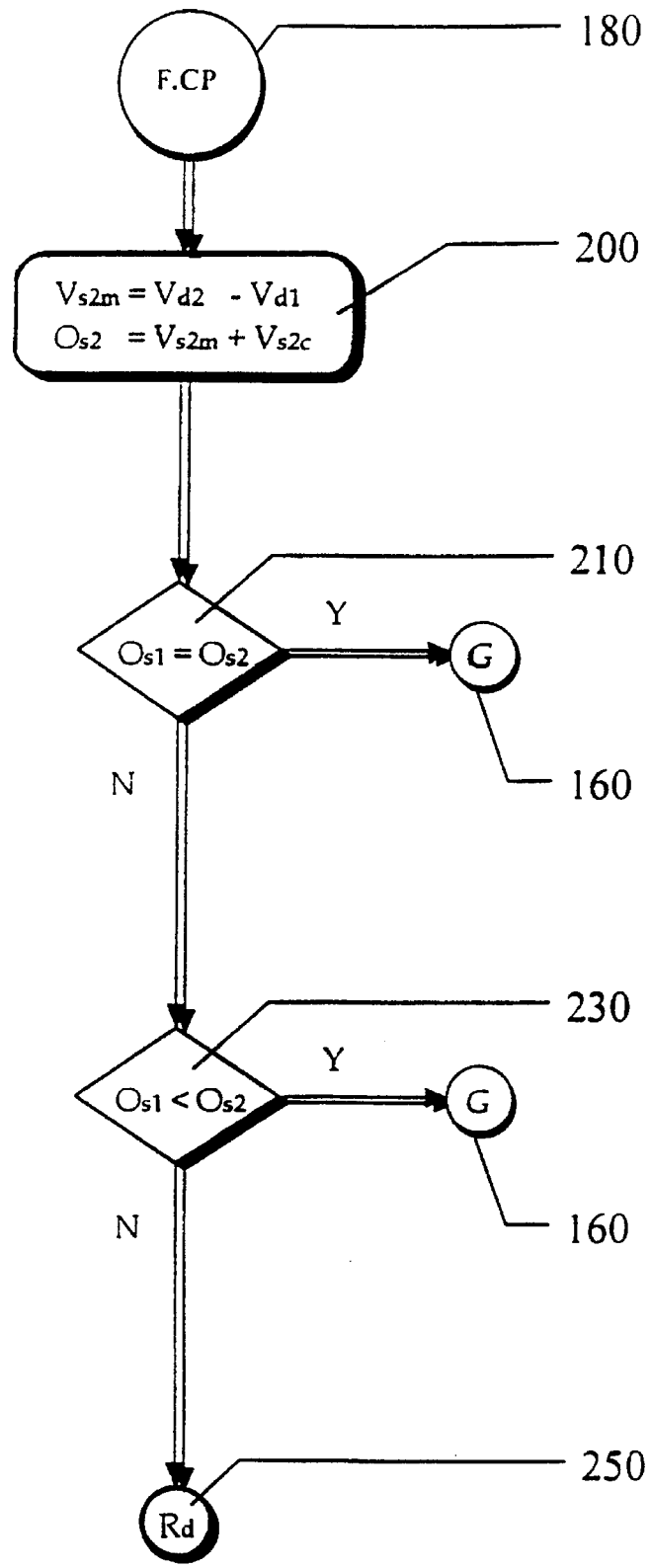

As shown in FIG. 5, this subroutine determines whether the object in front is decelerating. If it is accelerating or moving at a constant velocity, and the distance is increasing, then there is no possibility of a collision. To this end, in step 200, the system measures the increase in the distance between the host vehicle and the object, and adds the distance moved by the host vehicle $v_{S2C}$ during time interval t, in order to obtain the variable $O_{S2}$, which represents the absolute distance moved by the object during the time interval. If the object moves the same distance during two time intervals (during initialization, the distance moved by the object during the previous time interval is stored by substituting $O_{S1}$ for $O_{S2}$), as determined in step 210, then the object is moving with constant velocity and at the same time moving away from the host vehicle, in which case subroutine 160 (the "green light" subroutine) is called. If the distance moved by the object is increasing, as determined by step 230, then the object is accelerating away from the host vehicle, which is also a green light condition. However, if the distance moved by the object is decreasing (as is also determined by step 230), then the object is decelerating, which is a potential problem even though the distance $v_{D1}$ is less then $V_{D2}$, and a warning subroutine is called (step 250—see FIG. 36).

Figure 6:
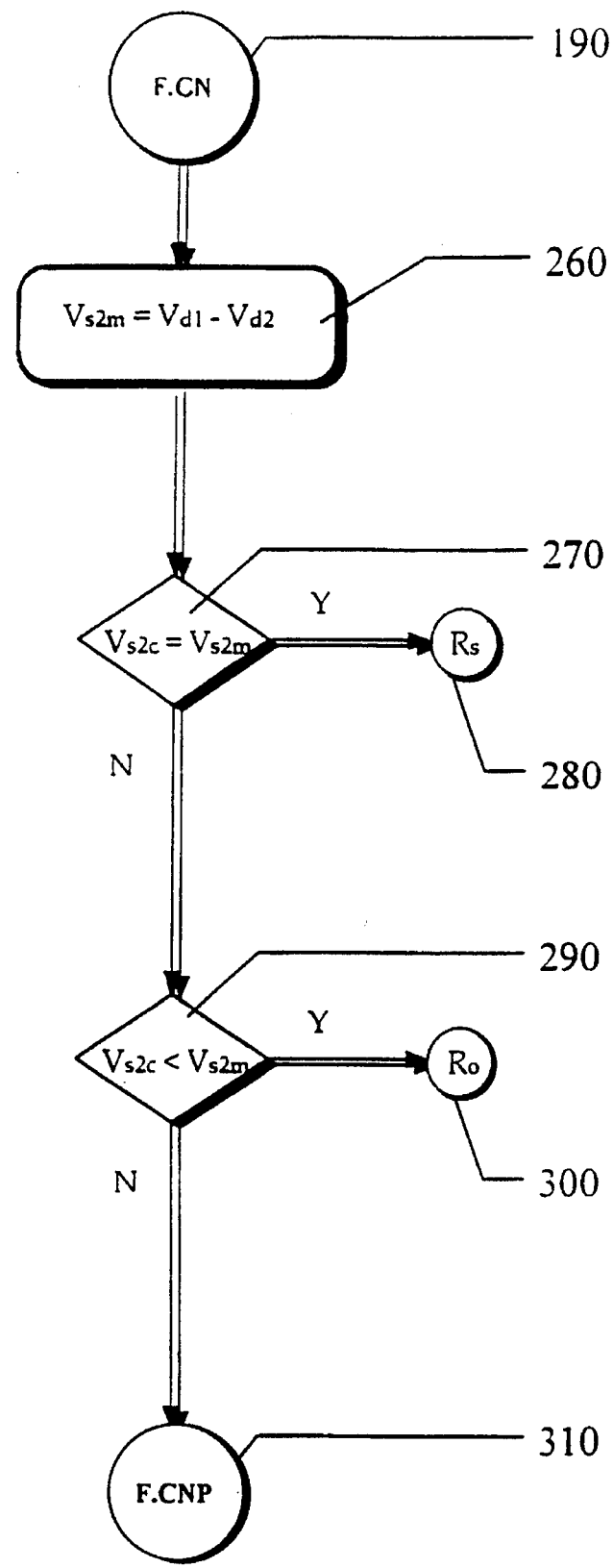

In the case where the object is getting closer, as shown in FIG. 6, the decrease in distance $v_{S2M}$ is once again determined (step 260) and, if this decrease in distance is equal to the distance moved by the host vehicle $v_{S2C}$, as determined in step 270, then the object is not moving, and a warning situation is indicated (step 280). If the distance moved by the host vehicle is less than the decrease in distance between the host vehicle and the object, as determined in step 290, then the object in front is either moving towards the host vehicle with acceleration, constant velocity, or deceleration, and a warning subroutine is called in step 300 (see FIG. 37).

Figure 7:
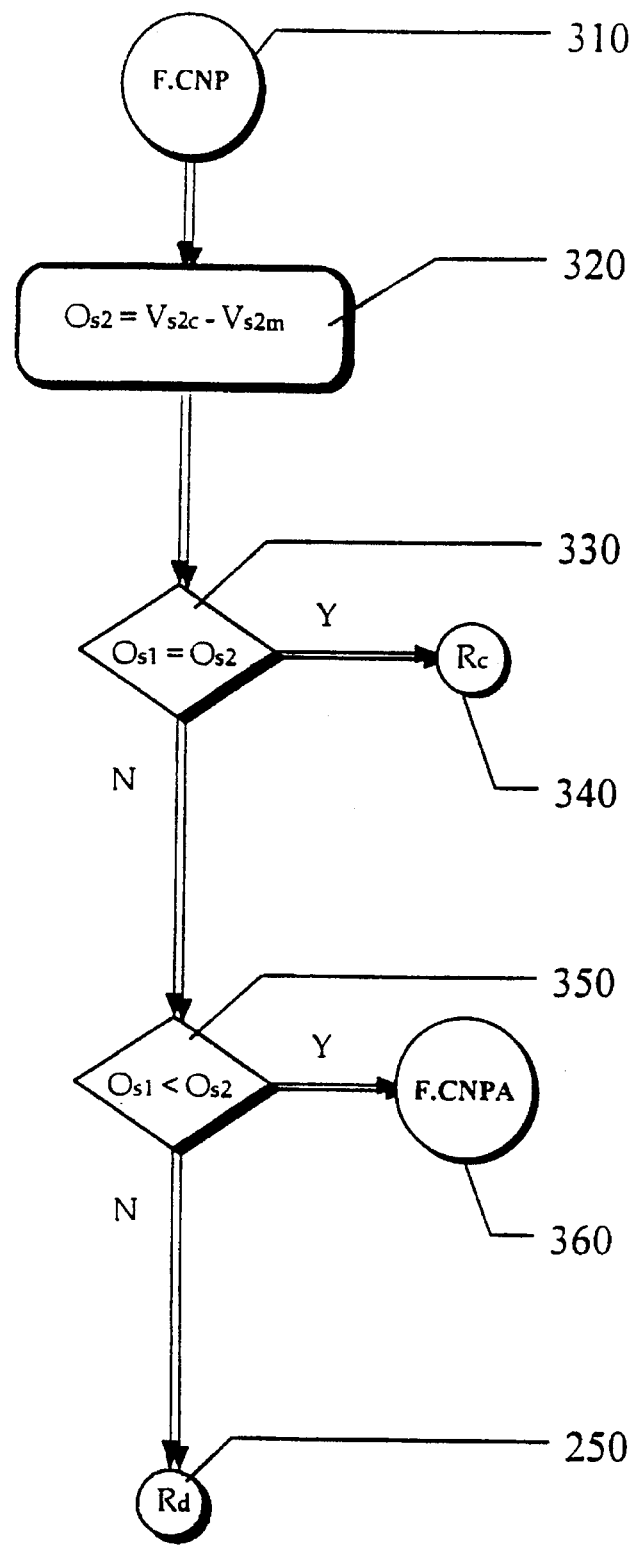

However, if the distance travelled by the host vehicle is greater than the amount by which the distance between the host vehicle and the object is decreasing, then the object moving in the same direction as the host vehicle, and can either be accelerating, moving at a constant velocity, or decelerating, in which case another subroutine is called at step 310 (see FIG. 7).

This situation, illustrated in FIG. 7, presents the potential for a collision no matter whether the object is accelerating toward the host vehicle, is travelling at a constant velocity, or is decelerating, but the severity of the danger is affected by which of the three conditions is present. The determination in this situation involves obtaining the absolute value of the distance travelled by the object during the interval, by subtracting the relative distance change between the host vehicle and the object from the distance travelled by the host vehicle during time interval t (step 320). If the object has moved the same distance through two intervals, as determined at step 330, then it is moving with a constant velocity, but the constant velocity is lower than the host vehicle velocity because the object is getting closer (this was determined in step 290 shown in FIG. 6), and a warning subroutine is called (step 340—see FIG. 34). On the other hand, if the distance moved by the object during two time intervals is increasing, as determined at step 350), then the object is accelerating even though the relative distance between the host vehicle and the object is presently decreasing, and a check must be made as to whether the object will accelerate away before the distance decreases to zero (subroutine call 360, shown in FIG. 8). Finally, if the distance is increasing, then the object is decelerating, and imminent collision situation is presented (subroutine call 250—see FIG. 36).

Figure 8:
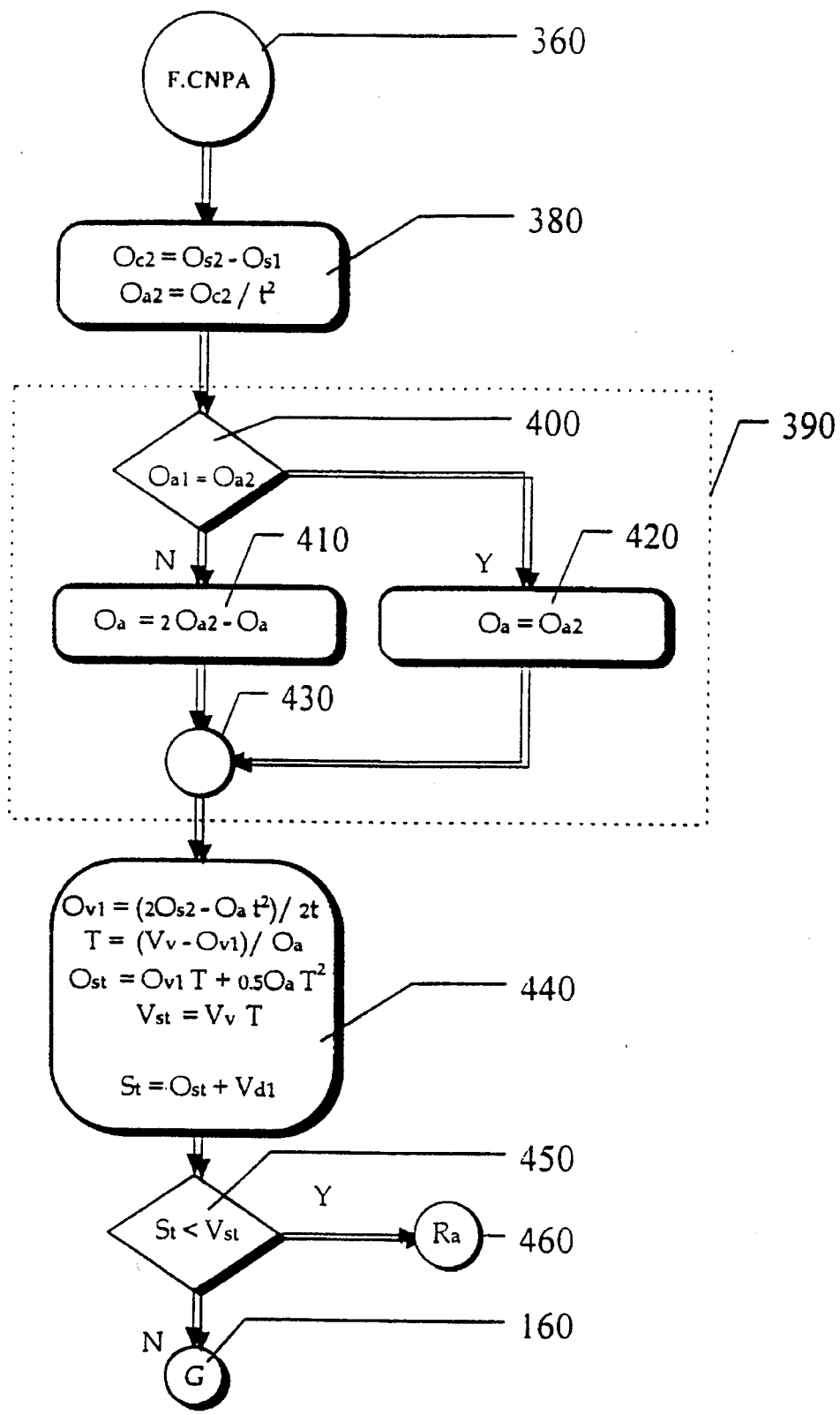

As illustrated in FIG. 8, in order to determine whether a collision will occur before the object accelerates sufficiently to start moving away from the host vehicle, the absolute acceleration of the object must be determined. This is accomplished by measuring the change in absolute distance travelled by the object over the two intervals and dividing the result by the square of the interval length to obtain the average acceleration of the object $O_{a2}$ over the current interval (step 380). The current average acceleration $O_{a2}$ is then compared with the average acceleration $O_{a1}$ over the previous interval (step 400) and, if equal, then the instantaneous acceleration $O_a$ is set equal to the current average acceleration of the object (step 410). If not, then the instantaneous acceleration is set equal to twice the current average acceleration minus the previously stored instantaneous acceleration (step 420).

After returning the variables obtained in steps 400–430, collectively referred to as step 390, the preferred electrical device determines the object's velocity $O_{V1}$ at the beginning of the interval, the time T needed for the object moving at the calculated acceleration to reach the host vehicle velocity (at which time the object will start to move away from the host vehicle), the distance $O_{St}$ moved by the object and the distance $V_{St}$ moved by the host vehicle during time T, and the sum $S_t$ of the distance moved by the object during time interval T and the relative distance between the host vehicle and the object during time interval T (step 440). Finally, as indicated by step 450, if the total moved by the host vehicle during time interval T is greater than the distance moved by the object plus the distance between the host vehicle and the object during the same time interval T, then there is going to be a collision, and an appropriate warning subroutine is called (step 460—see FIG. 35). If not, a green light condition is indicated (step 160).

(2) Host Vehicle Accelerating

Figure 9:
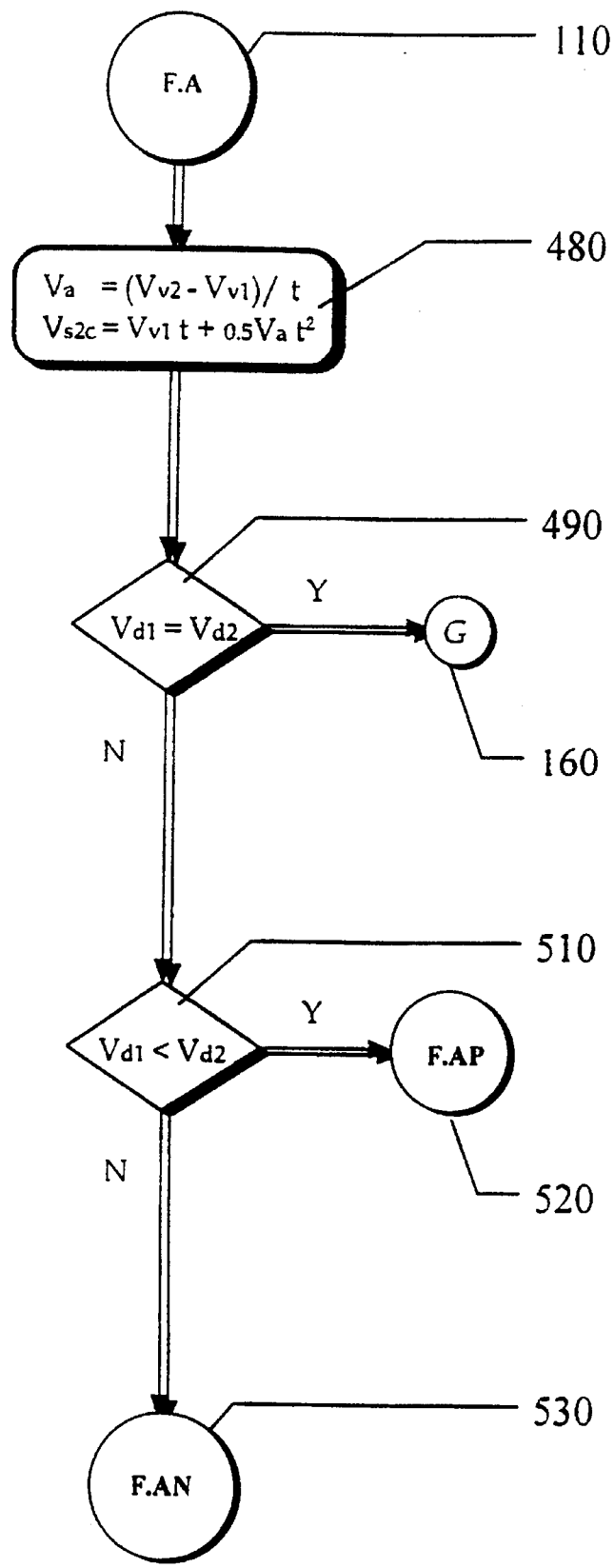

If, as determined by the procedure shown in FIG. 3, the host vehicle is accelerating, then the average acceleration is determined by dividing the change in velocity over the time interval by the length of the interval, and the distance $V_{S2C}$ moved by the host vehicle during this time is calculated based on the initial velocity value (step 480) Furthermore, as illustrated in FIG. 9, the distance between the host vehicle and the object during two successive intervals is compared (step 490), and if the distance has not changed even though the host vehicle is accelerating, then the vehicle in front is also accelerating at the same rate, and a green light condition is indicated (step 160). However, if the distance is increasing, as determined by step 510, then the object is either accelerating away at a higher rate of speed, moving with a constant velocity, or decelerating. Both the constant velocity and the deceleration condition present the potential for a collision, and a subroutine is therefore called in step 520 (see FIG. 10) to determine whether either of these two conditions applies. If the distance is decreasing, then the object may either be stationary, moving in the same direction as the host vehicle with acceleration, moving in the same direction with a lower constant velocity, moving in the same direction with deceleration, or moving in an opposite direction with acceleration, constant velocity, or deceleration. The existence of any of these conditions is determined by subroutine call 530 (see FIG. 12).

Figure 10:
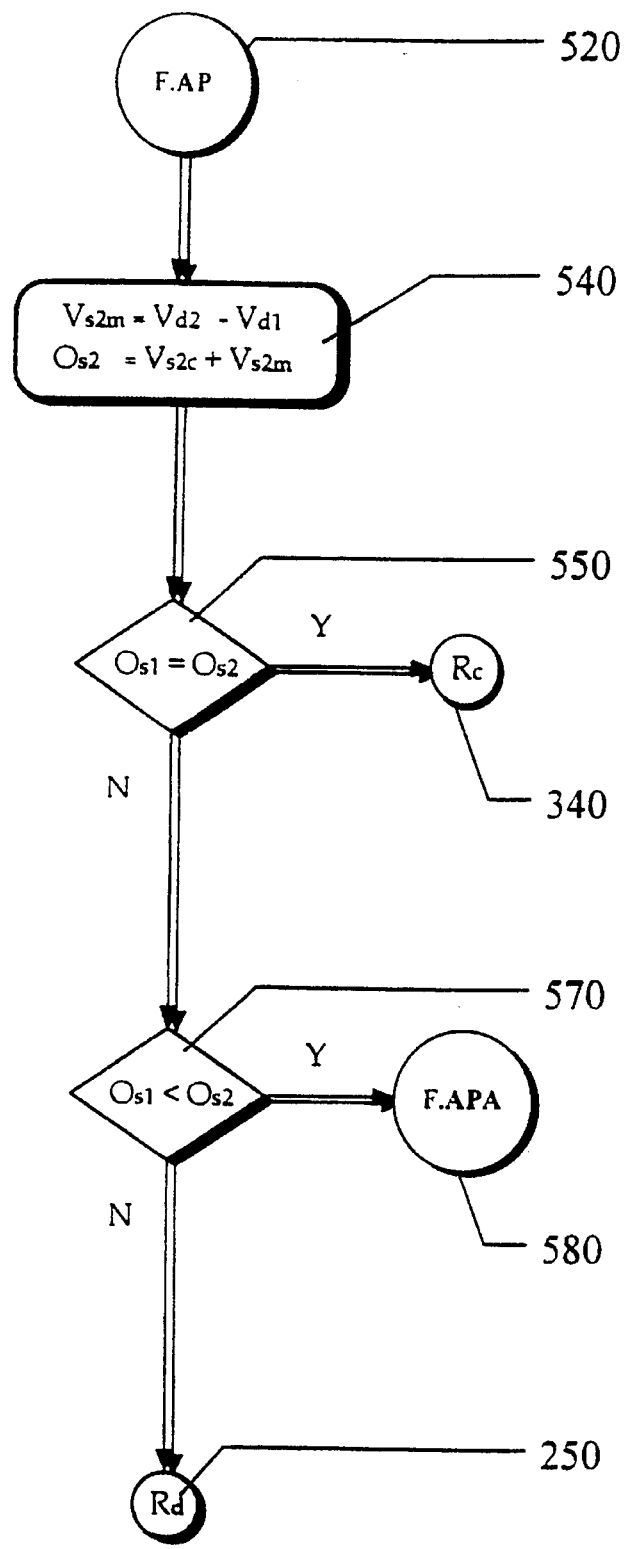

As shown in FIG. 10, when the object is moving away from the host vehicle because it is moving in the same direction with a velocity which is currently higher than the accelerating host vehicle, whether the object is moving with a constant velocity, accelerating, or decelerating, the controller subtracts the distances between the host and the object at times $t_1$ and $t_2$ to obtain the amount by which the distance is increasing, and adds the distance moved by the host vehicle to obtain the absolute distance moved by the object during the interval (step 540). If the distance moved by the object during two successive intervals is the same, as determined at step 550, then the object is moving with a constant velocity in which case, because the host vehicle is accelerating, the host vehicle will eventually overtake the object, a warning subroutine is called (step 340). If the distance moved by the object during the interval is greater than the distance previously moved, then the object is accelerating and whether a collision will occur depends on whether the object or the host vehicle is accelerating at a greater rate, as determined by the subroutine illustrated in FIG. 11 and called in step 580. If the preferred apparatus determines, at step 570, that the front object is decelerating because the distance moved is less during the current interval than during the previous interval, then the host vehicle is clearly in danger of hitting the object and a subroutine for generating a warning of imminent danger is accordingly called (step 250).

Figure 11:
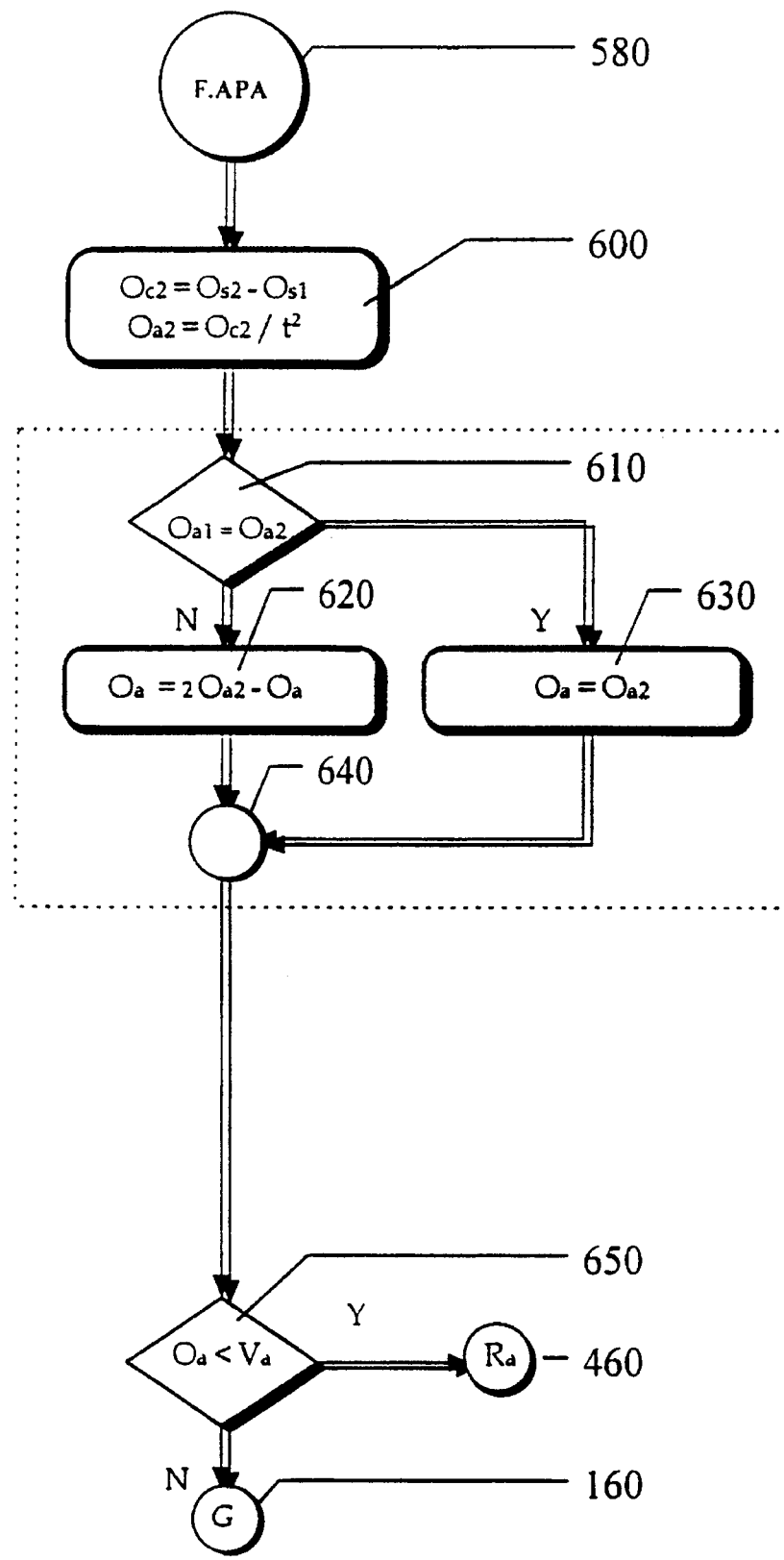

As shown in FIG. 11, the procedure for determining the acceleration of the object, which is necessary to determine which vehicle is accelerating faster (steps 600–640) is the same as previously used in steps 380–430 for determining the average acceleration $O_a$ of the object. The resulting object acceleration value is compared with the host vehicle acceleration in step 650, and if the host vehicle acceleration is greater than the object acceleration, a warning signal $R_a$ subroutine is called in step 460. If the host vehicle acceleration is not greater than the object acceleration, then there is no danger of collision and a green indication is generated (step 160).

Figure 12:
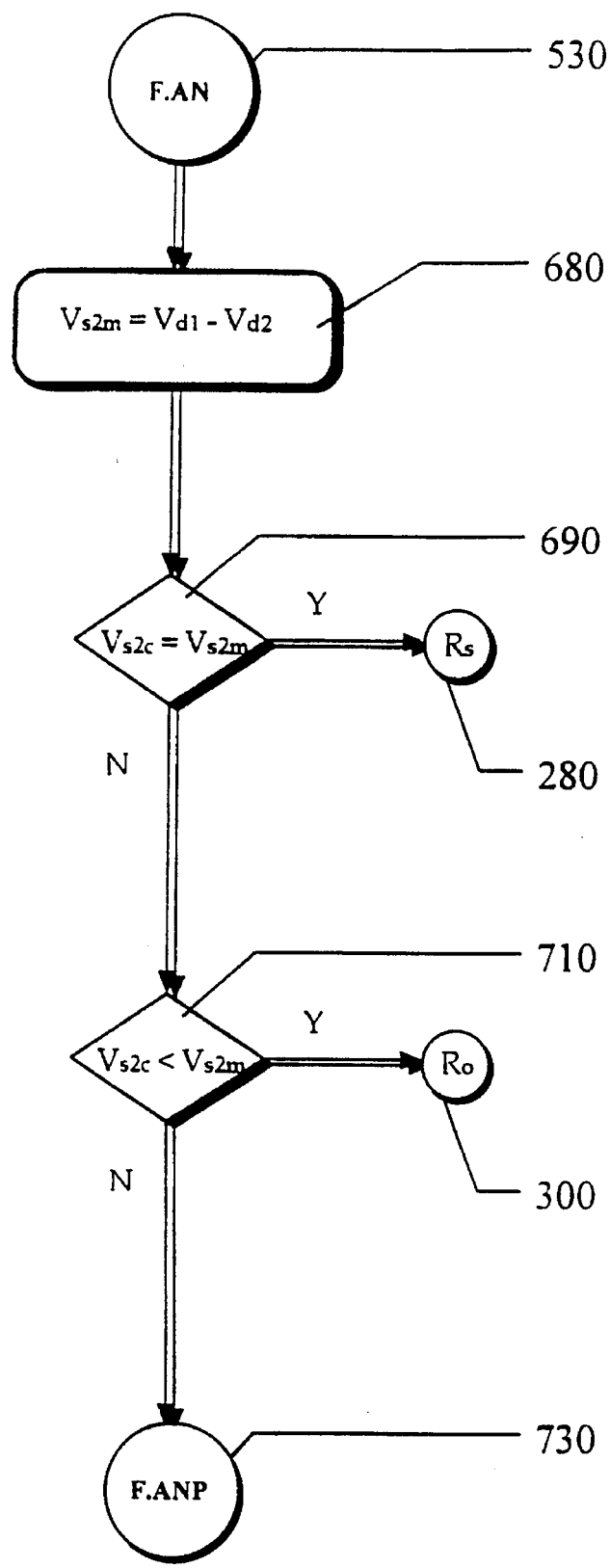

For the case, illustrated in FIG. 12, in which the host vehicle is overtaking the object, the preferred apparatus first determines the distance by which the distance between the host vehicle and the object is decreasing during the current time interval (step 680), and then compares that distance with the distance moved by the host vehicle during the interval (step 690). If the distance by which the object is being overtaken is the same as the distance moved by the host vehicle, then the object is not moving and a signal $R_s$ is generated by the subroutine called in step 280. If not, then the object is either moving towards the host vehicle or away from it. If the object is moving towards the host vehicle, as determined by step 710, the host vehicle having previously been determined to be accelerating, then an alarm signal is generated by the subroutine called in step 300. If the object is moving in the same direction as the host vehicle, then it may be moving with constant velocity or decelerating, in which case the accelerating host vehicle would overtake the object, or the object is accelerating in the same direction as the host vehicle, in which case the absolute accelerations and distances of the host vehicle and object must be taken into account. These determinations are accomplished the subroutine called in step 730 and illustrated in FIG. 13.

Figure 13:
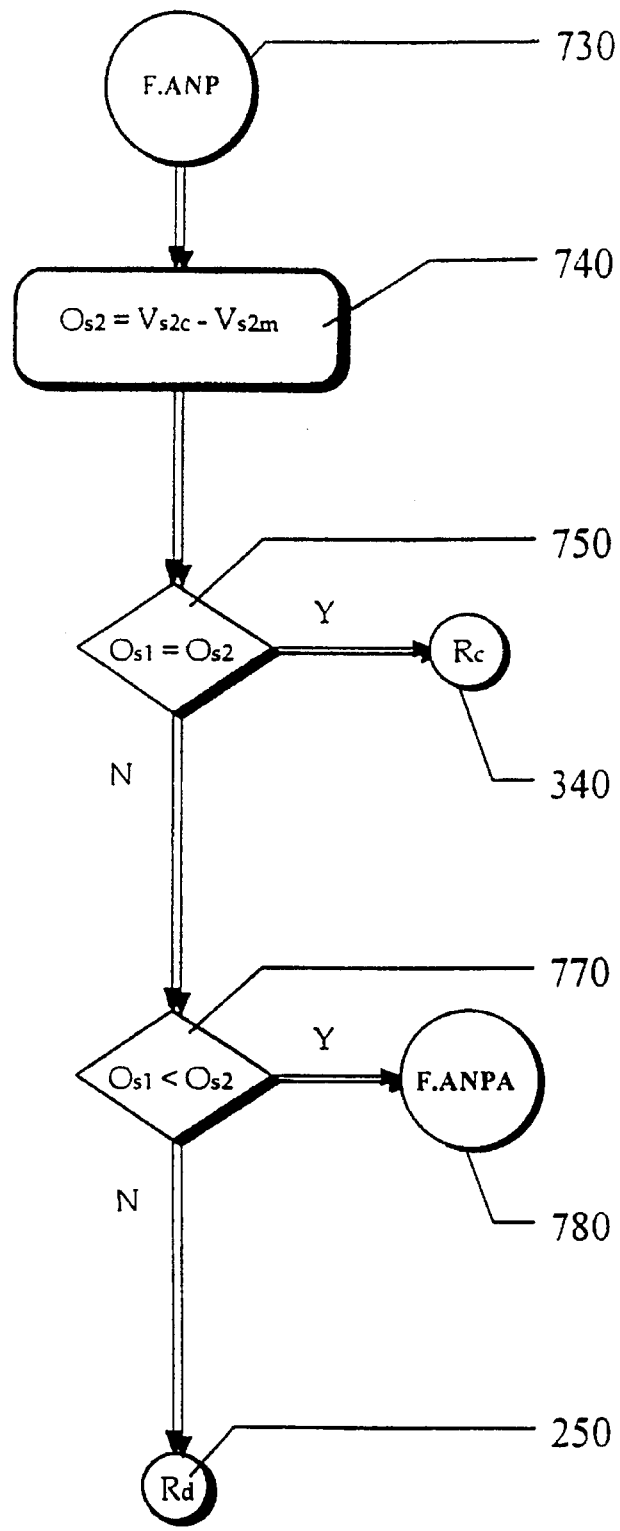
Figure 14:
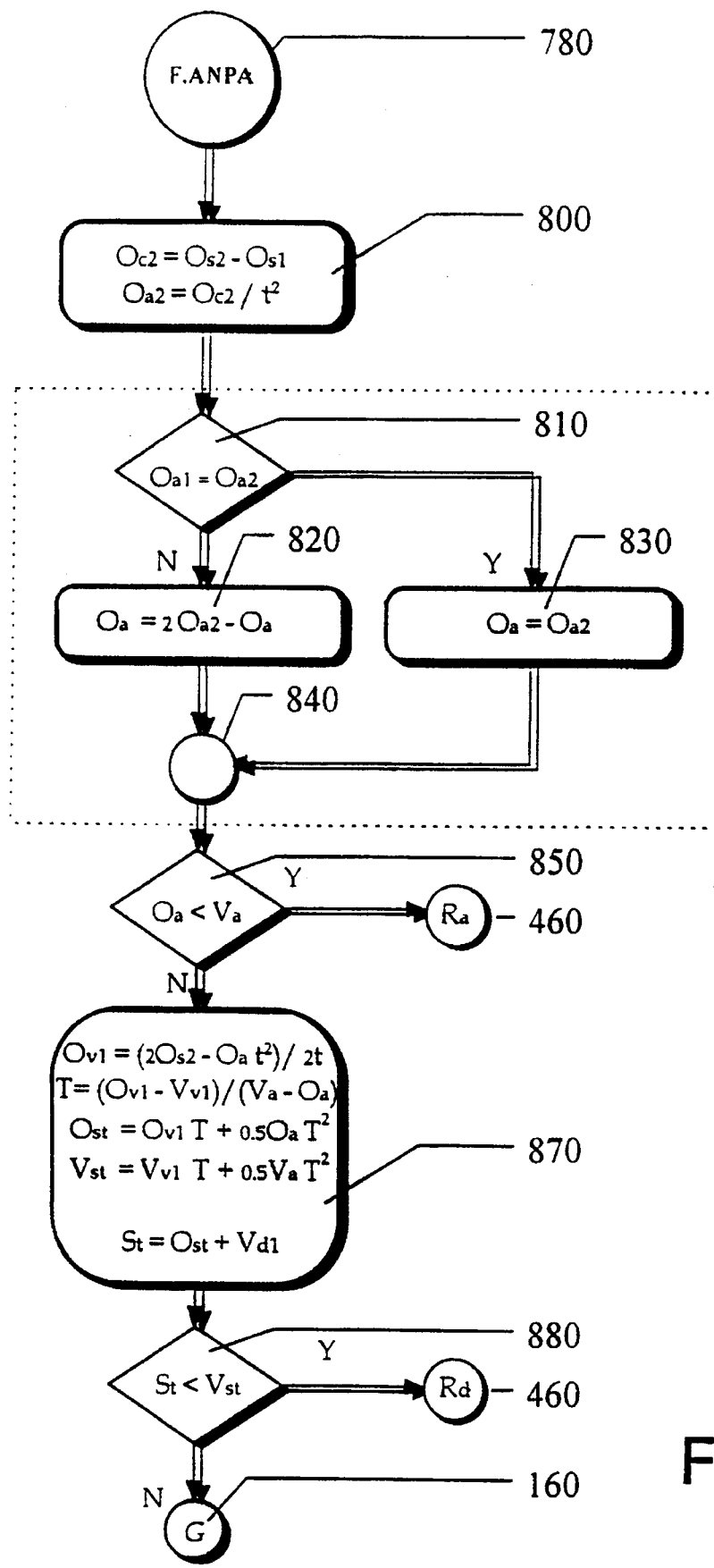
Figure 36:
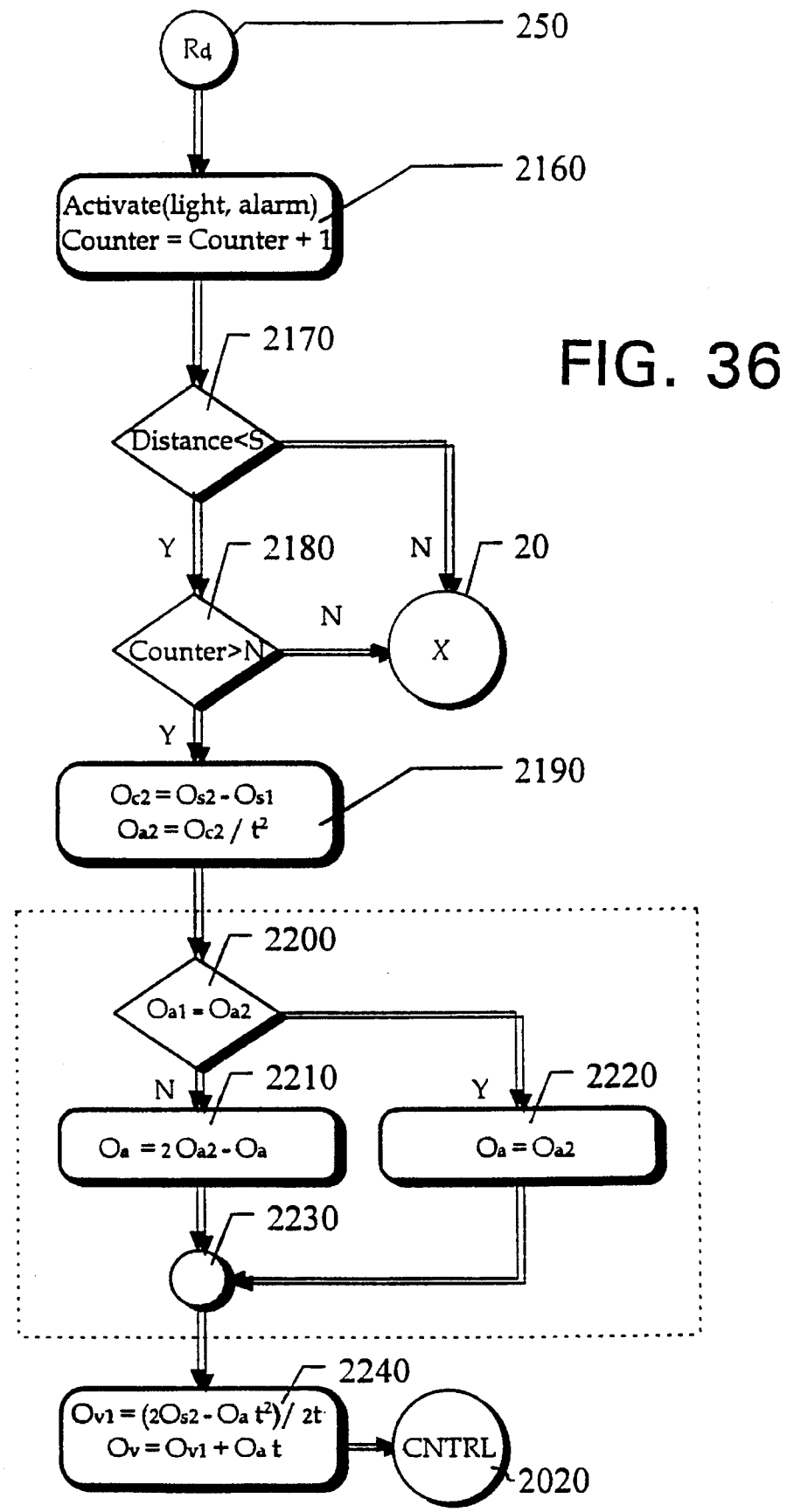

The subroutine shown in FIG. 13 begins by subtracting the decrease in host vehicle-to-object distance from the distance moved by the host vehicle to determine the absolute distance moved by the object (step 740) and, if the distance moved by the object is the same as during the previous interval, determines that the object is moving with constant velocity (step 750) and calls the warning subroutine 340. If step 750 determines that the object is not moving at a constant velocity, then the system determines whether the object is accelerating or decelerating by determining whether the distances moved by the object during the two intervals of time are increasing or decreasing (step 770). If the object is accelerating, more determinations are required and the subroutine shown in FIG. 14 is called (step 780). If the object is decelerating, the warning subroutine shown in FIG. 36 is immediately called by step 250.

The subroutine shown in FIG. 14 begins by determining the absolute acceleration moved by the object during a time interval t using a procedure (steps 800–840) identical to that shown in FIG. 8, except that in step 850, the accelerations of the host vehicle and object are compared and, if the object has an acceleration smaller than or equal to that of the host vehicle, which is accelerating, then an alarm signal is generated by the subroutine called in step 460.

Step 870 first determines an initial object velocity $O_{v1}$ based on the distance $O_{S2}$ moved by the object during the current interval and the object acceleration $O_a$. Next, the time T needed for the object to reach the same velocity as the host vehicle is predicted based on the ratio of the differences in the velocities $O_{v1}$ and $V_{v1}$ and accelerations $O_a$ and $V_a$ which have previously been determined, after which the system determines the total distance $V_{St}$ which will be travelled by the host vehicle during time T, and the total distance $O_{St}$ which will be travelled by the object during time T (by using the formula $S = v_o t + \frac{1}{2}at^2$, described above, and substituting T for t and the respective velocities $O_{v1}$ and $V_{v1}$ and accelerations $O_a$ and $V_a$). The total distance $V_{St}$ extrapolated in step 870 for the host vehicle is compared in step 880 to the sum of the distance $O_{St}$ extrapolated for the object and the distance $S_t$ between the host vehicle and the object to determine if the host vehicle will overtake the object during time T before the object starts pulling away from the host vehicle, and an appropriate signal is generated by the subroutines called in steps 160 (the host vehicle will not overtake the object) and 460 (the host vehicle will overtake the object).

(3) Host Vehicle Not Moving

Figure 15:
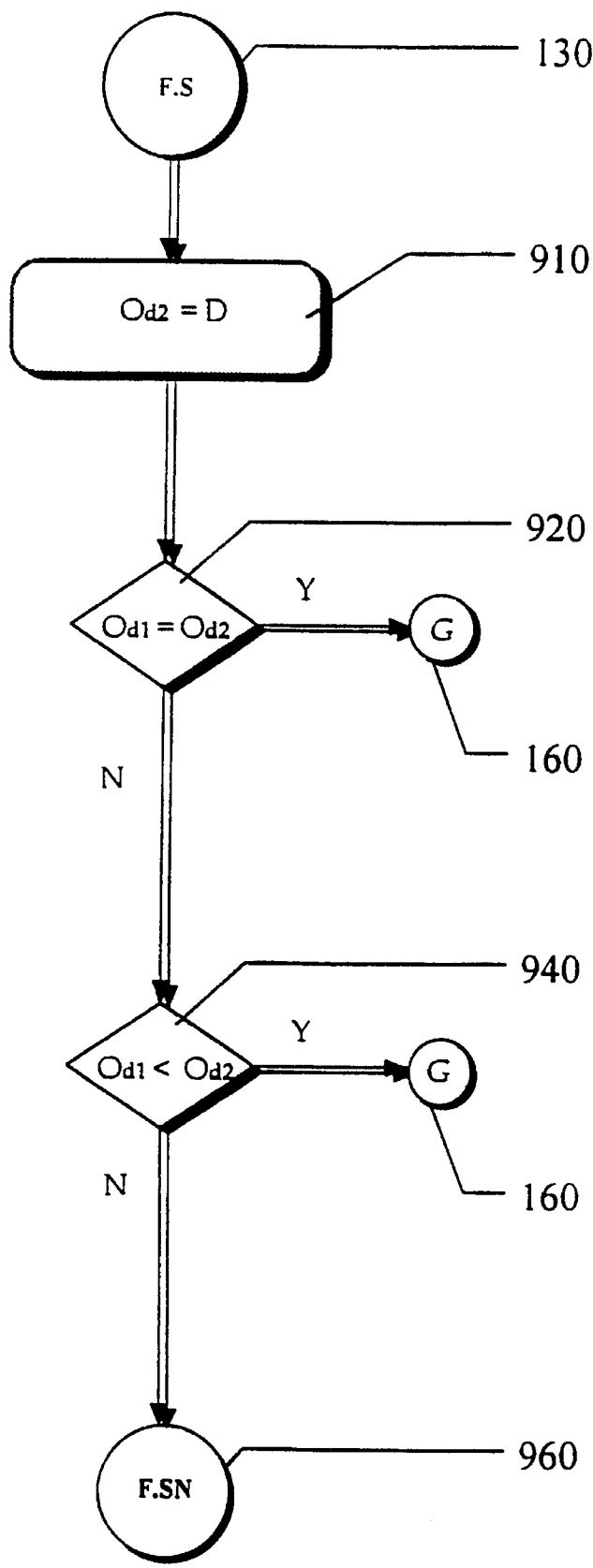

For the situation where the host vehicle is not moving, as determined in FIG. 3, the subroutine shown in FIG. 15 first sets the variable $O_{D2}$ equal to the relative distance between the host vehicle and the object (step 910) and compares it with the previously measured distance $O_{D1}$. If the distances are the same, as determined by step 920, the object is not moving, and a safe indication is generated (step 160), but if the distance is greater than the previously measured distance, as determined by step 940, then the object is moving away from the vehicle and a safe indication is appropriate (step 160). Otherwise, the previous distance is greater than the current distance and the object is being overtaken, in which case a clear danger is presented if the object is accelerating or moving with constant velocity, and a possible danger is presented if the object is decelerating. The subroutine called by step 960 and illustrated in FIG. 16 determines the extent of the danger presented by this situation.

Figure 16:
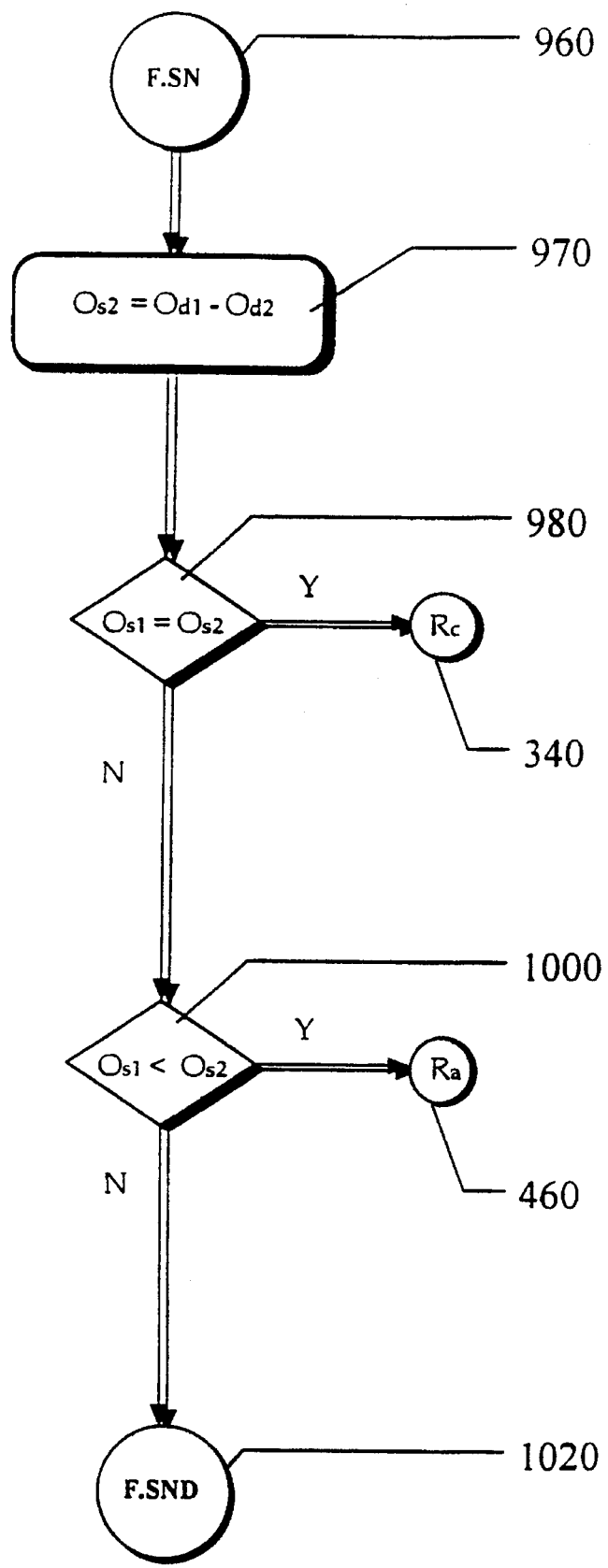
Figure 17:
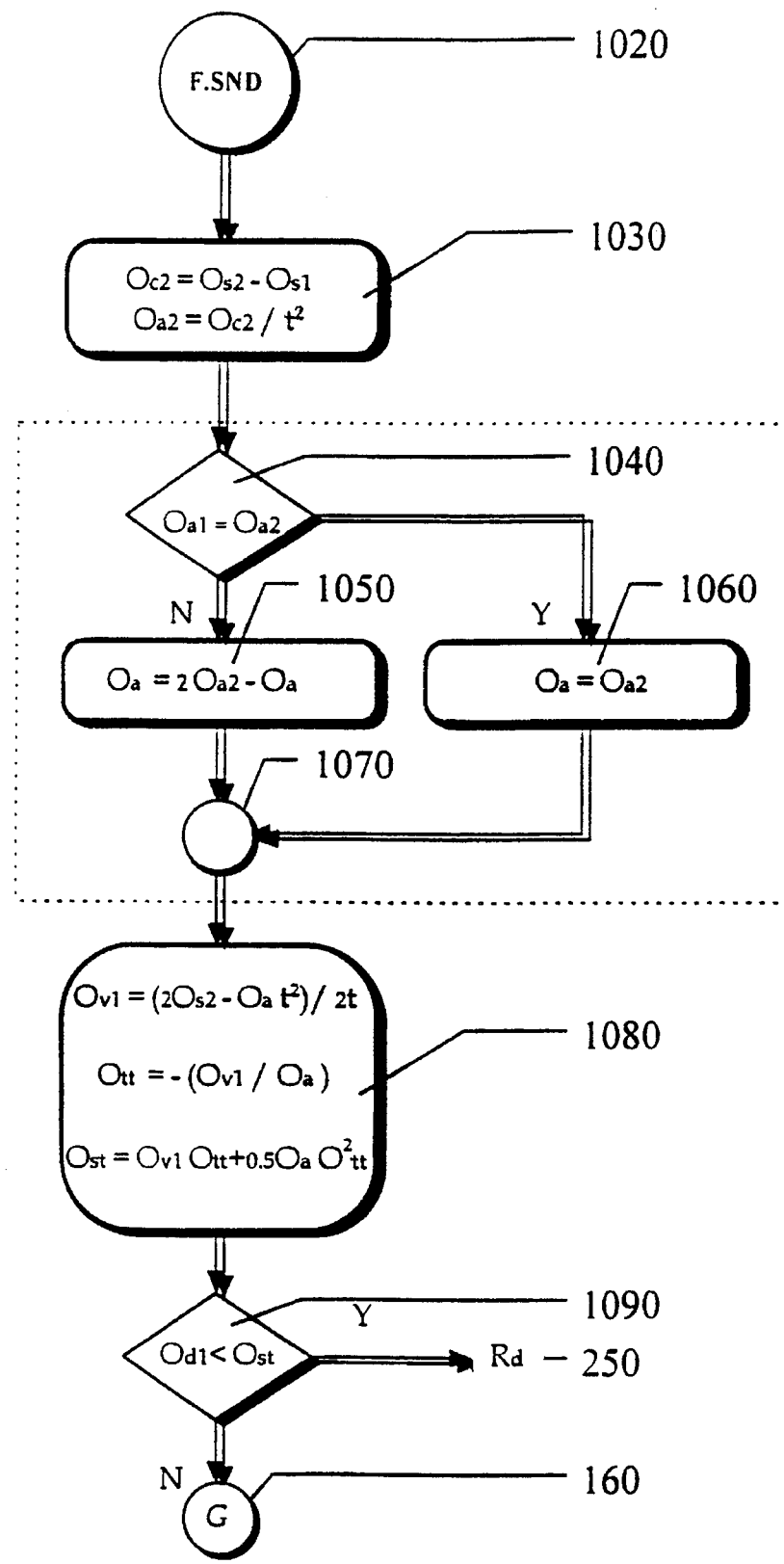

To accomplish the determination of whether the object presents a danger when the host vehicle is not moving but the object is moving towards the host vehicle, as shown in FIG. 16, the distance moved by the object during an interval is obtained by subtracting the initial and final measured distances between the host vehicle and the object (step 970), and comparing the result with a previously obtained object travel distance (step 980). If the distances are equal, then the object is moving with constant velocity and an alarm is generated by the subroutine called in step 340. If, as determined at step 1000, the distance is increasing, then another alarm is generated by the subroutine called by step 460. However, if the distance is decreasing and the object is decelerating, then it must be determined whether the object is decelerating fast enough to avoid colliding with the host vehicle, i.e., whether the speed of the object will reach zero before the distance between the host vehicle and the object reaches zero. This is accomplished by calling a subroutine (step 1020) which implements exactly the same procedure (steps 1030–1090, 160, and 250) as in FIG. 8, except that it is the object distances that are compared rather than the host vehicle distances, as shown in FIG. 17.

(4) Host Vehicle Decelerating

Figure 18:
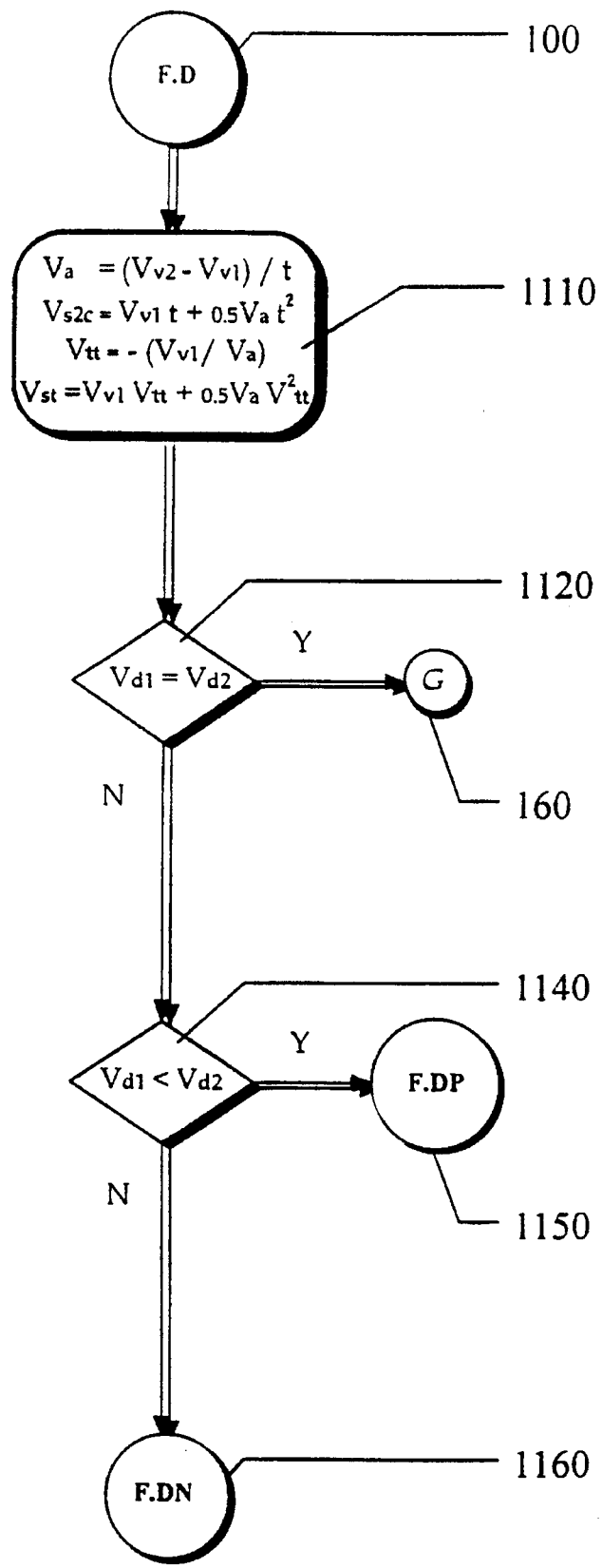

For the situation where the host vehicle is decelerating, as determined by step 90 shown in FIG. 3, the subroutine called in step 100 and illustrated in FIG. 18 determines in step 1110 the host vehicle acceleration (by dividing the distance traversed during an interval by the length of the interval), the total time needed for the host vehicle to stop at this deceleration (which is equal to the initial velocity divided by the average deceleration), and finally the total distance that the host vehicle will traverse before it stops.

The preferred apparatus then compares checks whether the distance between the host vehicle and object is changing and, if it is not changing, determines that no collision will occur (step 1120, subroutine 160). If the distance is increasing, then a danger is presented only if the object is decelerating faster than the host vehicle, while if the distance is decreasing, then the possibility of a collision exists if object is moving in the same direction as the host vehicle with a faster deceleration, a lower constant velocity, is stationary, is not accelerating sufficiently to start moving away from the host vehicle, or is moving towards the host vehicle and not decelerating fast enough to avoid a collision (step 1140, subroutines 1150 and 1160).

Figure 19:
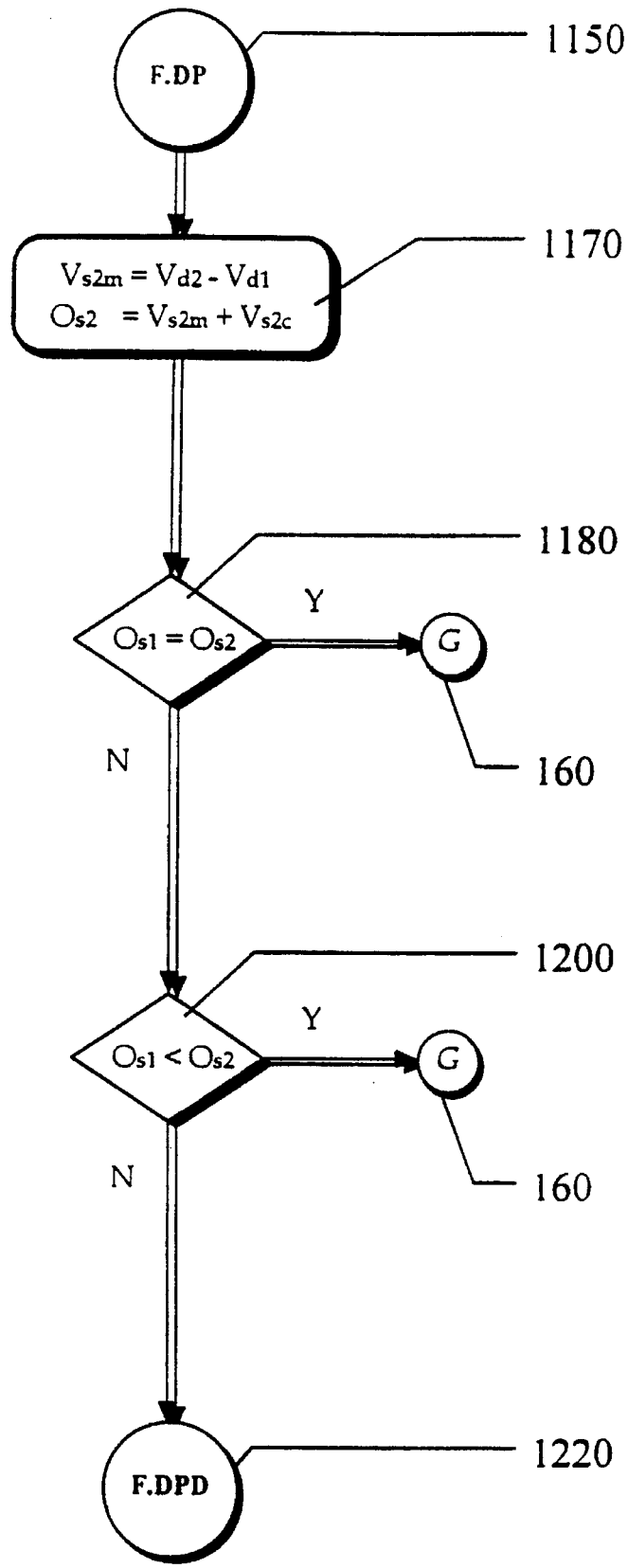

In the case where the distance is determined to be increasing, as shown in FIG. 19, the preferred apparatus first determines whether the object is moving with constant velocity or accelerating (steps 1170–1200, 160), and if neither a constant velocity nor an acceleration condition is detected, a subroutine for determining the distance the object will stop, travel before it stops is called (step 1220).

Figure 20:
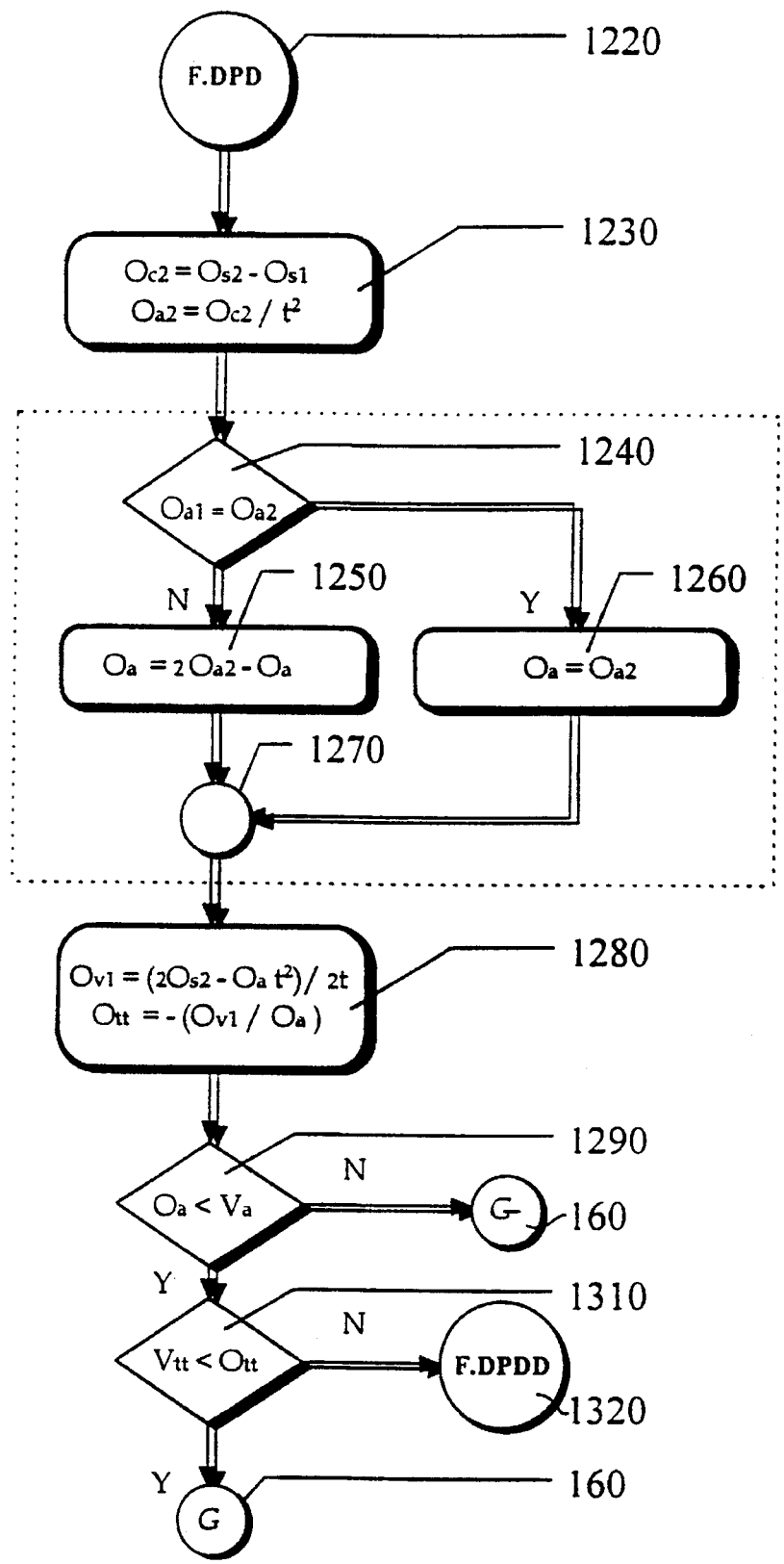

The subroutine called in step 1220 and illustrated in FIG. 20 determines the distance to zero velocity of the object by using the same procedure (steps 1230–1280) used in the subroutine shown in FIG. 17 to determine the extrapolated stopping distance, after which the decelerations of the host vehicle and object are compared and a determination is made in steps 1290 and 1310 that either the object is decelerating at a greater than the host vehicle, in which case the safe indication subroutine is called, the host vehicle will stop before the object, in which the safe indication subroutine 160 is also called, or the object will stop before the host vehicle, in which case a subroutine for checking if the front object will stop before the host vehicle is called (step 1320).

Figure 21:
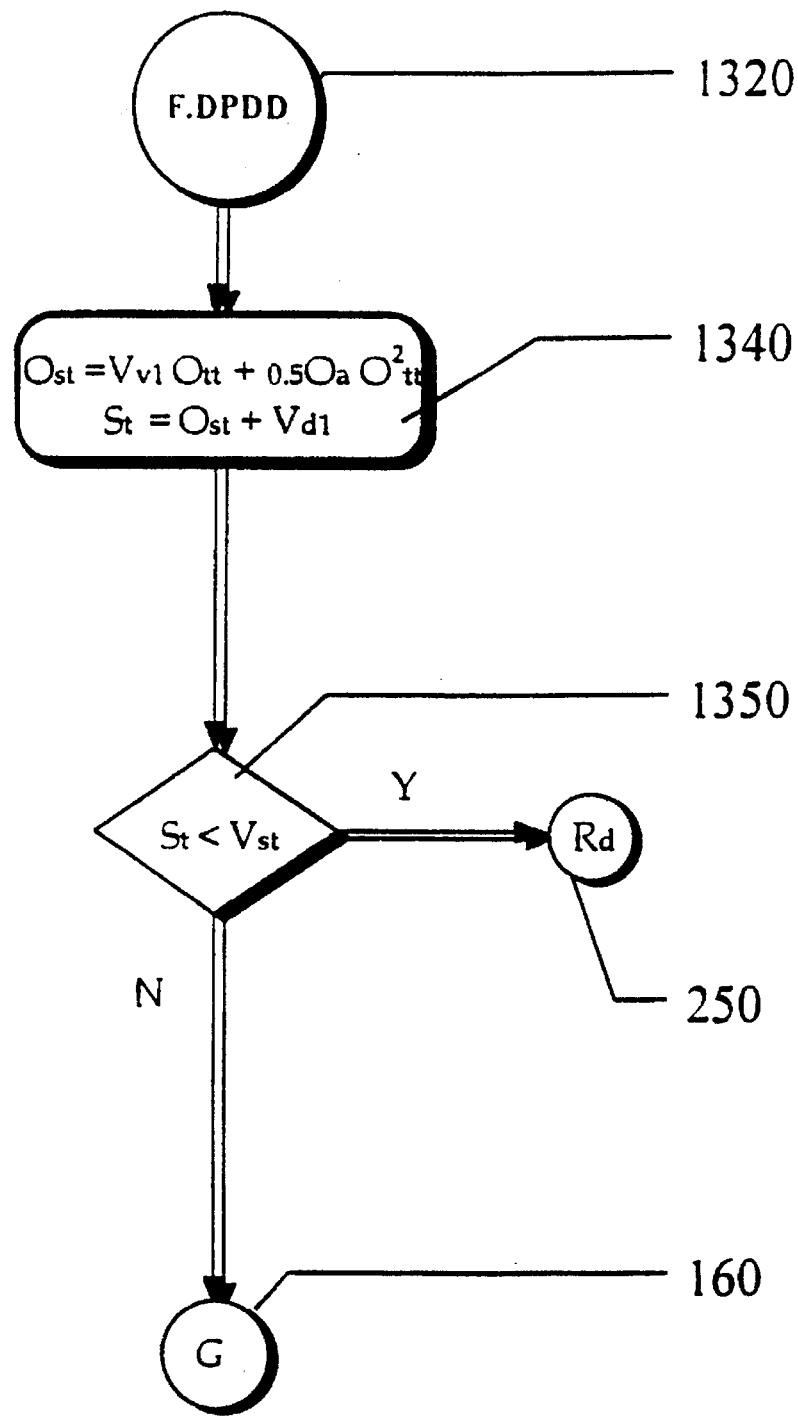

As shown in FIG. 21, the procedure called in step 1320 for checking if the object will stop before the host vehicle involves the steps of finding the total distance $O_{St}$ the object will travel before it reaches zero velocity, and the total distance $S_t$ that the host vehicle would have to travel to hit the object (step 1340). The stopping distance of the host vehicle $V_{St}$ is then compared with the distance to collision $S_t$ (step 1350) and if the host vehicle will hit the object before stopping, a warning subroutine 250 is called. If the host vehicle will stop before hitting the object, the safe indication subroutine 160 is called.

Figure 22:
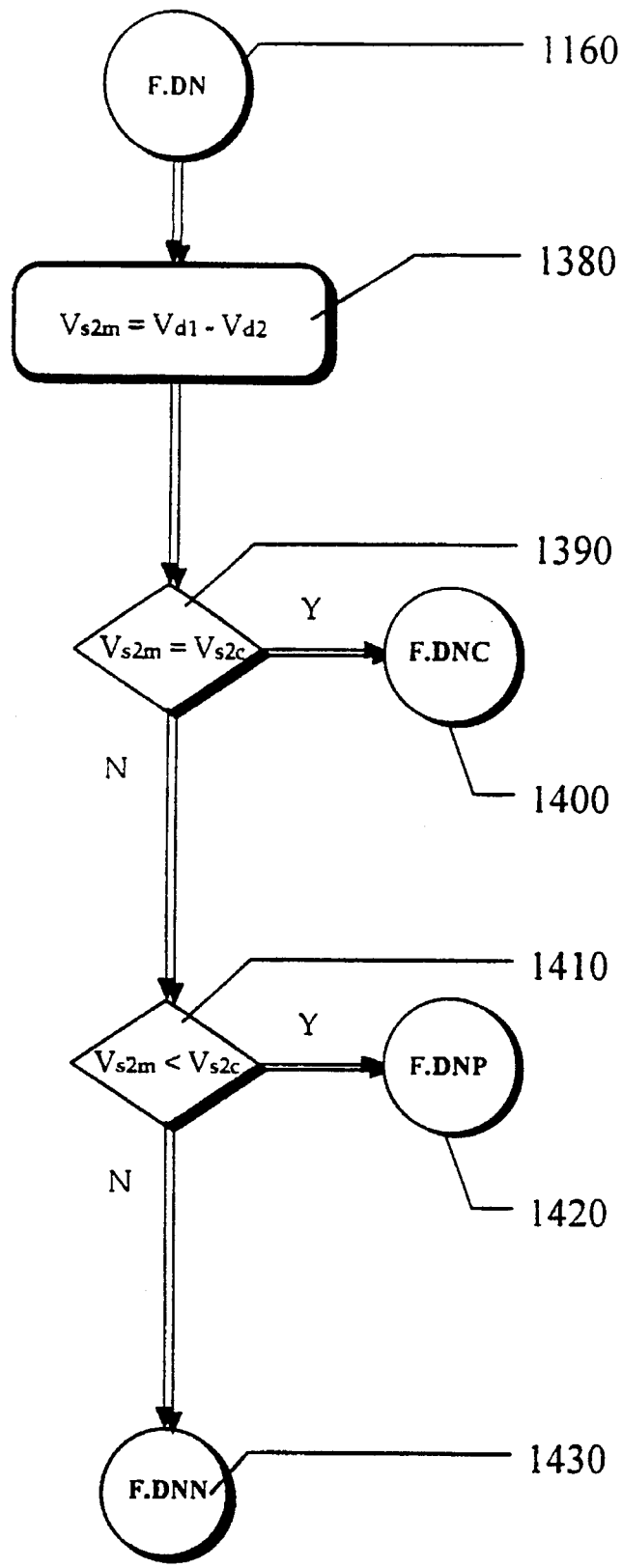

The subroutine shown in FIG. 22 is called when the host vehicle is decelerating and the distance between the host vehicle and the object is decreasing, as determined by step 1140 shown in FIG. 18. In order to determine whether the object is stationary, accelerating, or decelerating, the change in the relative distance between the host vehicle and the object during the current time interval is determined by subtracting the initial and final distances measured at the beginning and end of the time interval (step 1380), and then compared with the distance travelled by the host vehicle during the time interval (steps 1410 and 1390). If the distances are equal, then the object must be stationary, and the stopping distance of the host vehicle must be compared with the total distance between the host vehicle and the object to determine whether the host vehicle will stop in time at its current rate of deceleration (subroutine 1400—see FIG. 23).

Figure 24:
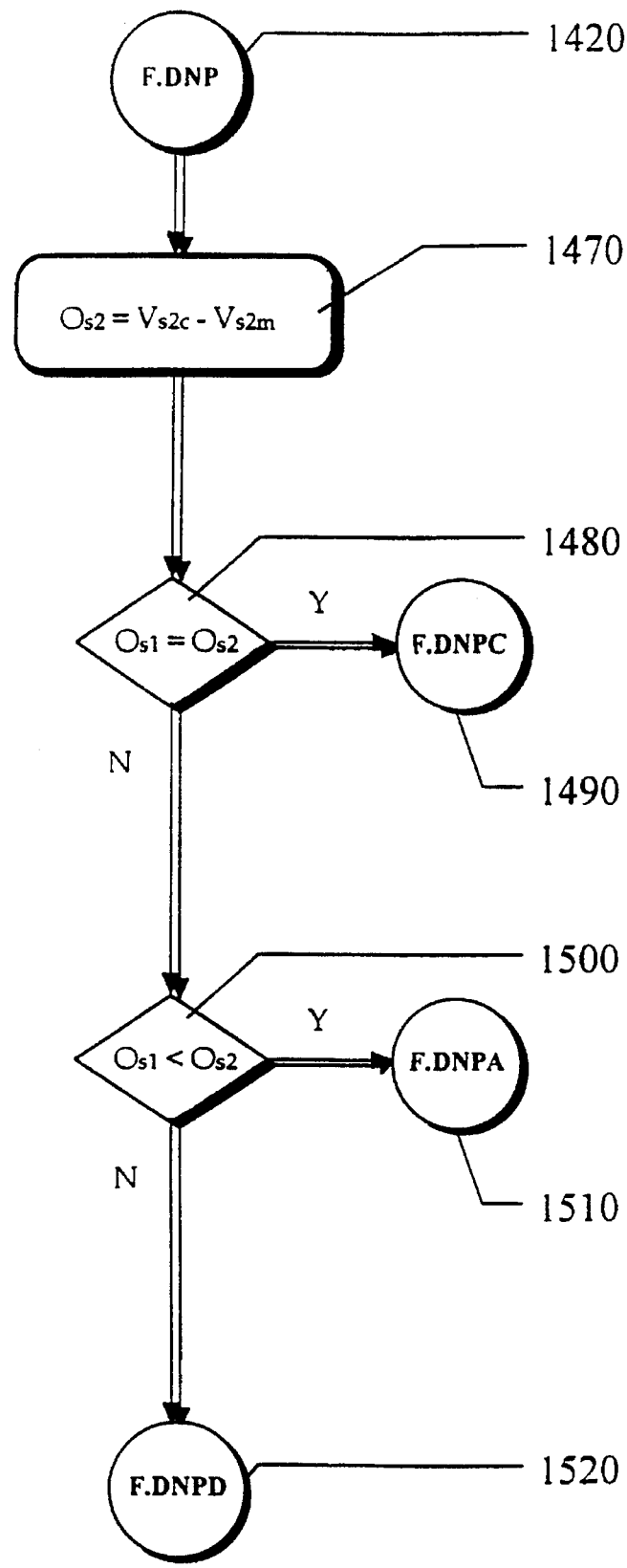

If the distance travelled by the host vehicle is greater than the change in distance from the host vehicle to the object, then the object could either be accelerating away from the host vehicle, moving with a constant velocity in the same direction as the host vehicle, or moving in the same direction as the host vehicle and decelerating, as determined by the subroutine called in step 1420 (see FIG. 24). If, on the other hand, the distance travelled by the host vehicle is smaller than the decrease in the relative distance between the host vehicle and the object, the object could be accelerating toward the host vehicle, moving with a constant velocity toward the host vehicle, or moving toward the host vehicle but decelerating, as determined by the subroutine called in step 1430 (see FIG. 30).

Figure 23:
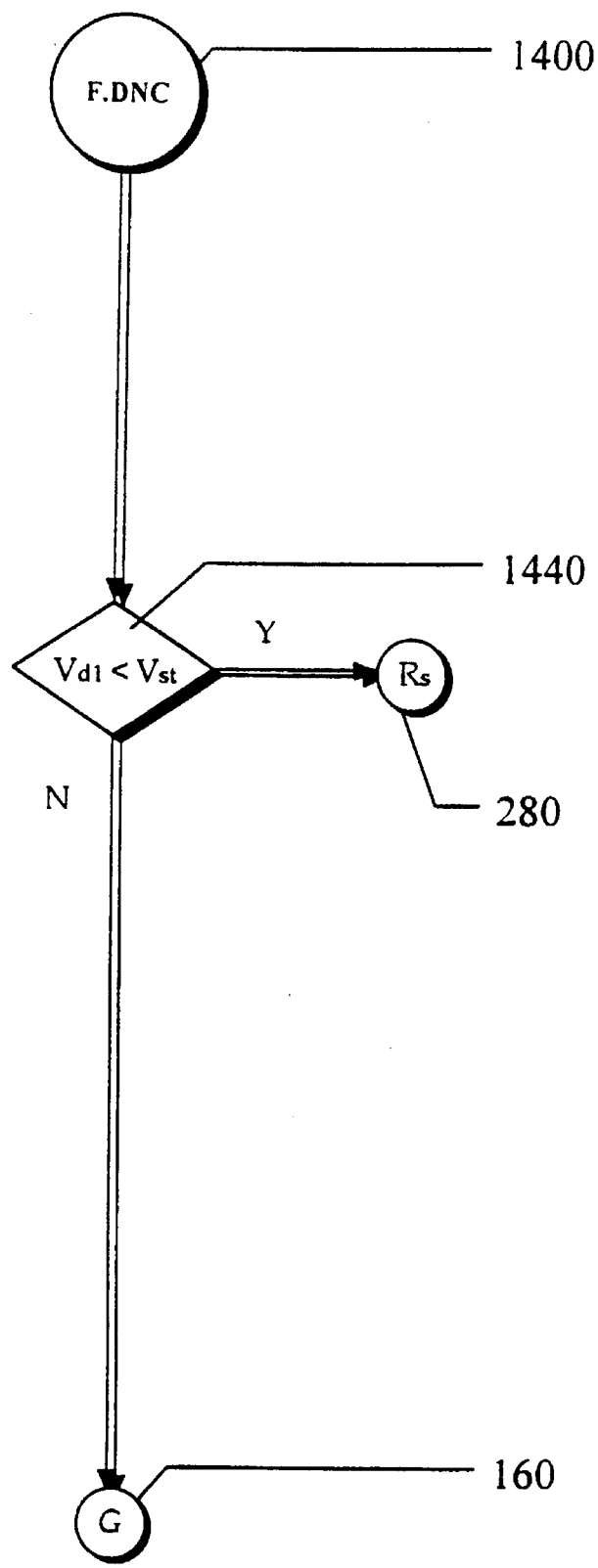

The subroutine called in step 1400 and illustrated in FIG. 23 simply involves comparing the relative distance between the host vehicle and the object with the previously determined extrapolated stopping distance of the host vehicle (step 1440). If the previously determined extrapolated stopping distance is greater than or equal to the relative distance, then no collision will occur, and the safe subroutine may be called (step 160). If it is less, than a collision is likely, and a warning subroutine is called (step 280).

The subroutine called in step 1420 involves the steps 1470, 1480, of determining and comparing the actual distance travelled by the object over two time intervals. If the distance is equal, then the object is travelling at a constant velocity and, depending on the rate of deceleration of the host vehicle, may present a danger of collision, as determined by the subroutine called in step 1490 (see FIG. 25). If the distance travelled by the object over successive intervals is increasing, then the object is accelerating, but the preferred apparatus must nevertheless still check whether the acceleration of the object is sufficiently large that the distance will stop decreasing before a collision occurs, as determined by the subroutine called in step 1510 (see FIG. 26). Finally, if the distance moved by the object per unit time is decreasing, then the rates of decrease must be checked to determine if the host vehicle is decelerating slowly enough to catch up with the decelerating object as determined by the subroutine called in step 1520.

Figure 25:
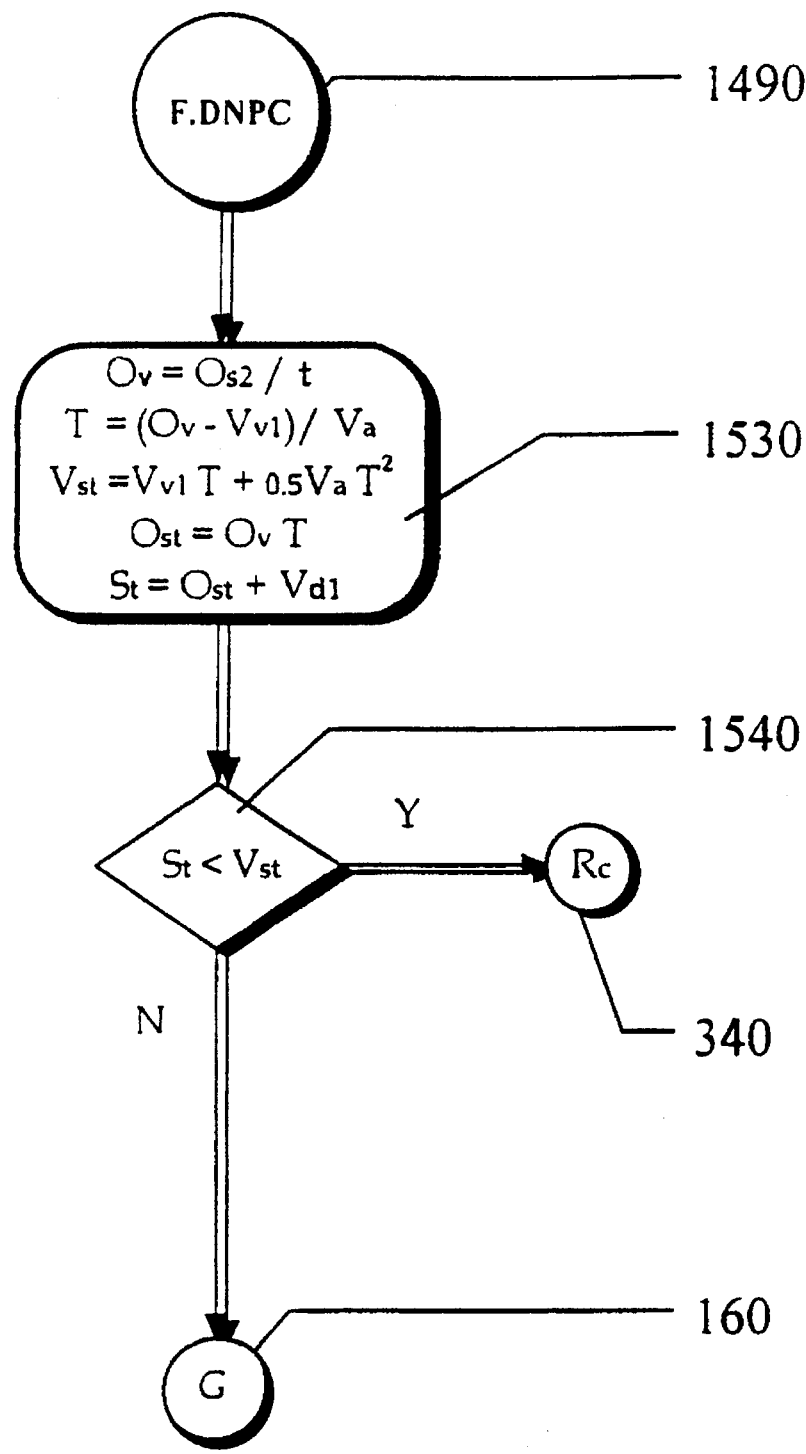

The subroutine called in step 1490 and illustrated in FIG. 25 begins with the step of determining the object constant velocity value, the time needed for the vehicle to reach the velocity of the object, the total distance travelled by the host vehicle in time T, the total distance travelled by the object in time T, and the distance which the host vehicle will have to traverse to reach the object (step 1530). The distance which the host vehicle needs to traverse to reach the object is then compared to the distance which the host vehicle will actually travel during interval T plus the relative distance $V_{D1}$ between the host vehicle and the object (step 1540) and either the green light or a warning subroutine (160 and 340, respectively) are called.

Figure 26:
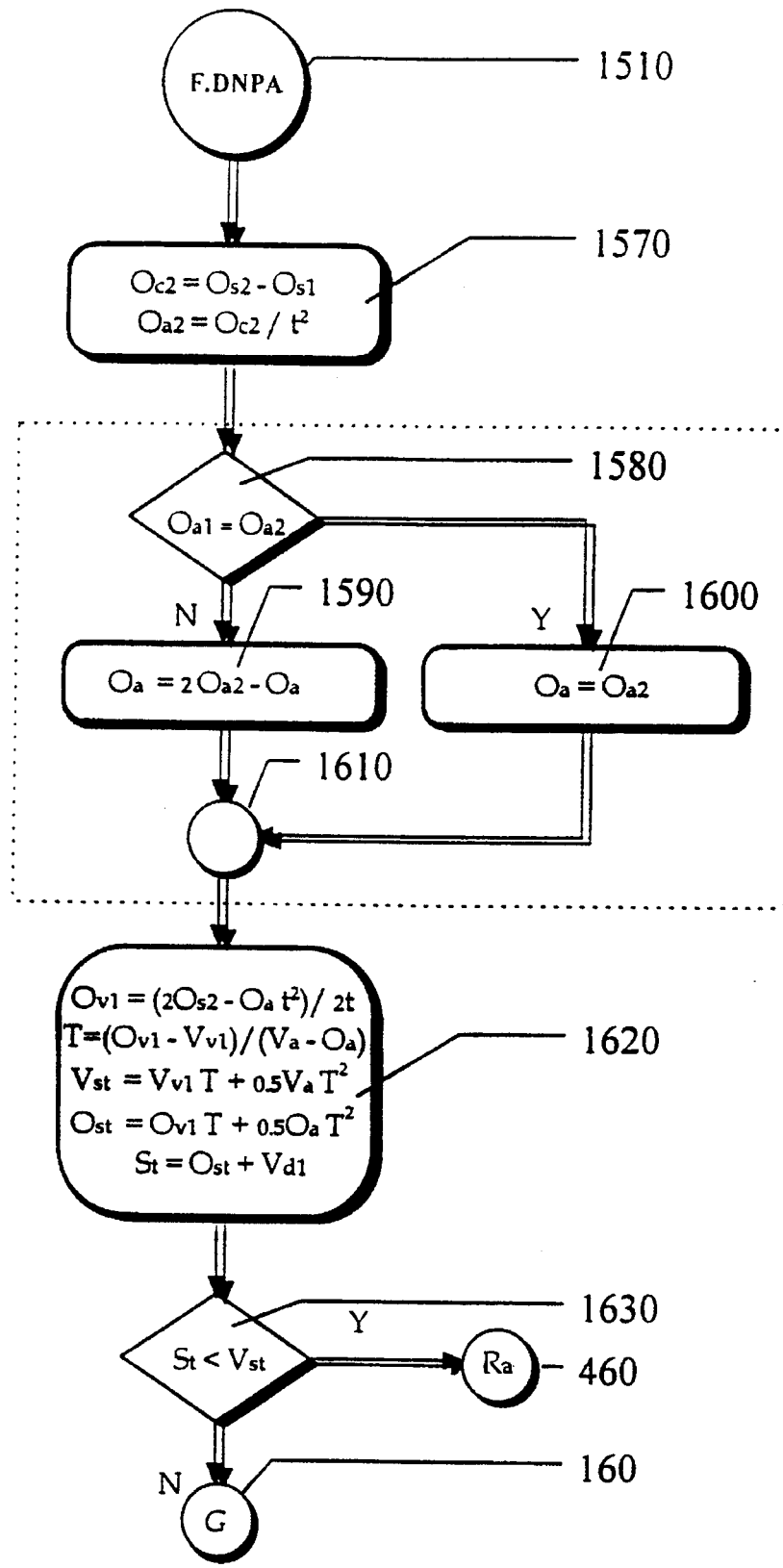

The subroutine called in step 1510 of FIG. 24 and illustrated in FIG. 26 involves finding the absolute acceleration of the object using the procedure described above in connection with FIG. 8 (steps 1570–1620), finding the time T needed for the object and the host vehicle to reach the same velocity at which the object starts to move away from the host vehicle, and comparing the distance travelled by the host vehicle during time T with the initial relative distance plus the distance travelled by the object during time T. Again, the result of the comparison (step 1630) is either the generation of a signal which activates a warning device (step 460) or the generation of a signal indicative of a safe condition (step 160).

Figure 27:
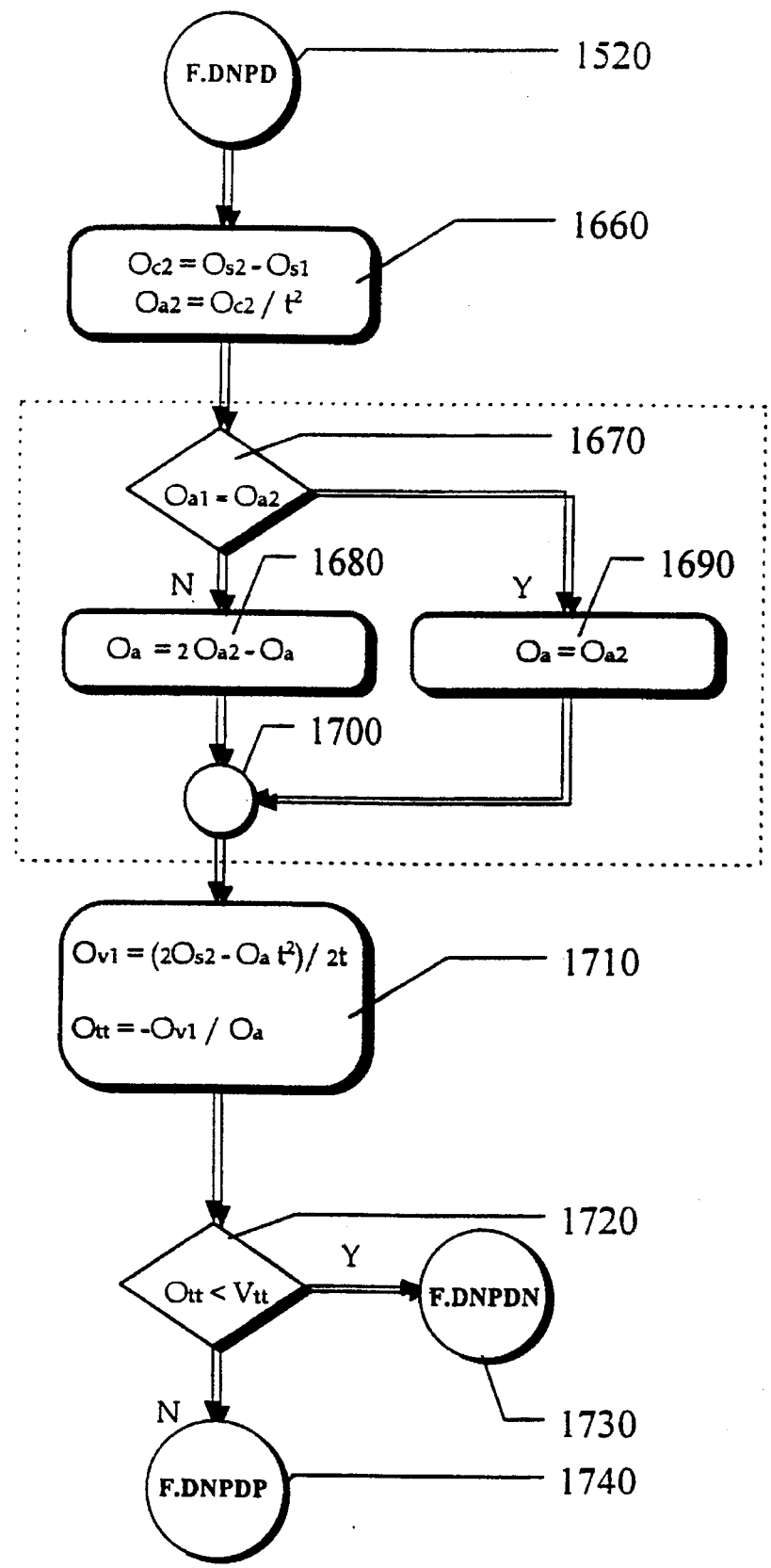

The subroutine called in step 1520 of FIG. 24 and illustrated in FIG. 27 also involves finding the absolute deceleration of the object using the procedure described above in connection with FIG. 8 (steps 1660–1710), and comparing the total time needed by the object to stop with the total time needed by the host vehicle to stop based on the respective decelerations (step 1720). Depending on which vehicle will stop first, different subroutines are called in steps 1730 and 1740.

Figure 28:
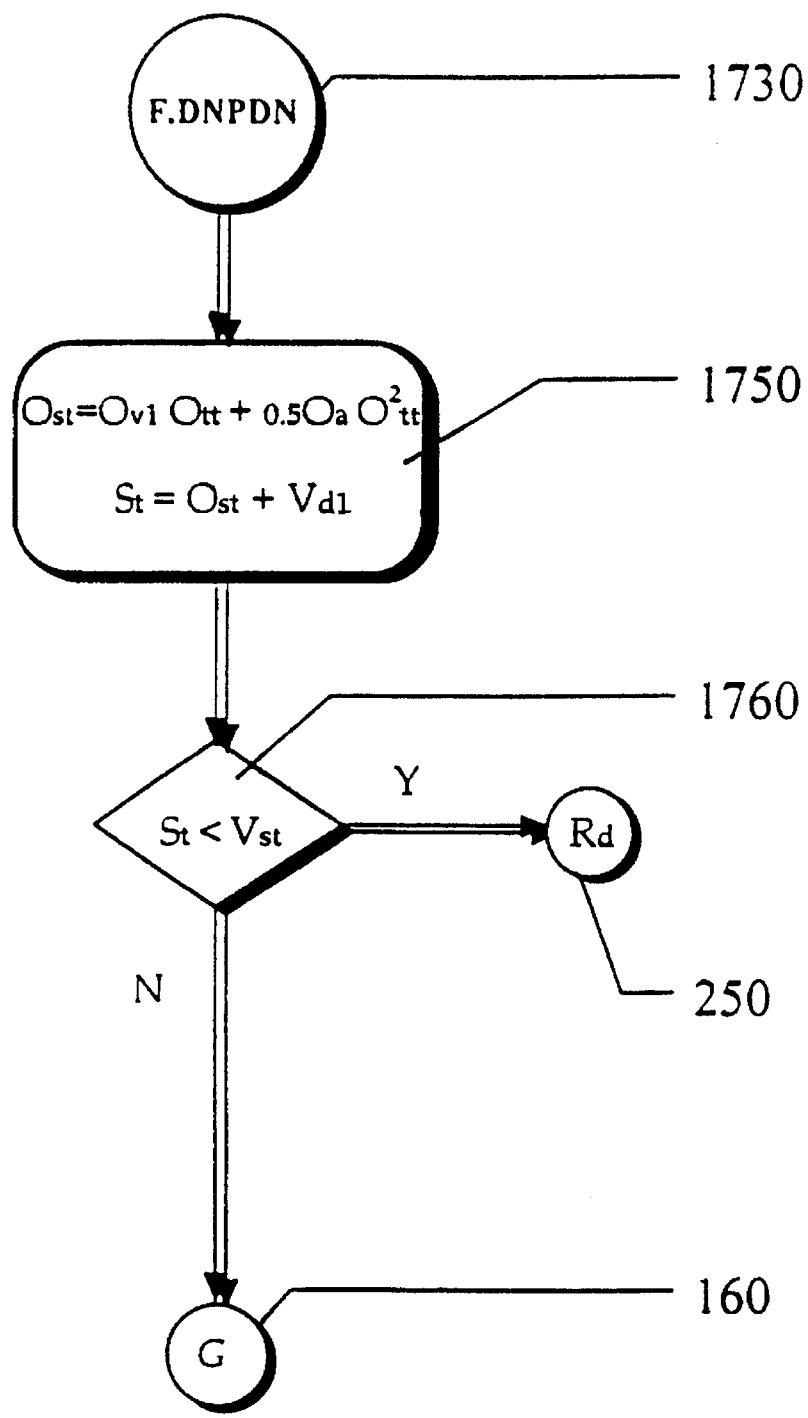
Figure 29:
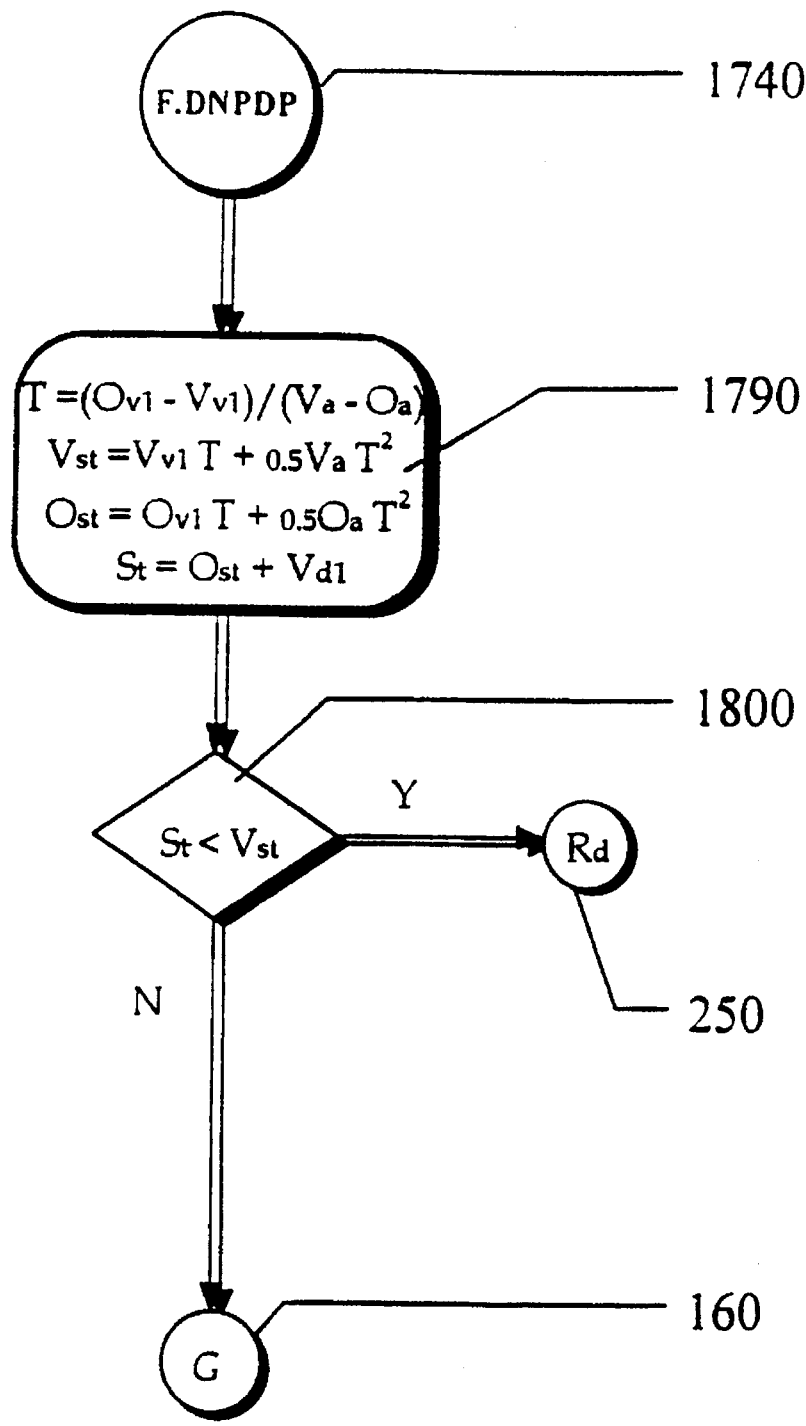

The subroutine called when the object will stop first, illustrated in FIG. 28, calculates the sum of the stopping distance of the object and the relative distance between the host vehicle and the object (step 1750) and compares the result with the stopping distance of the vehicle (step 1760) to determine whether a collision is likely, and then either calls the green light subroutine (step 160) or a warning subroutine (step 250). Conversely, the subroutine called when the host vehicle will stop first, illustrated in FIG. 29, first begins by calculating the time needed for the object to reach the same velocity as the object, at which time the object will start to move away from the host vehicle, and then calculates the change in relative distance between the host vehicle and the object at which this will occur (step 1790) and compares the result with the distance moved by the host vehicle in the same time (step 1800). If the host vehicle will stop first or the object will move away from the host vehicle before the relative distance becomes zero, then the safe subroutine is called by step 160. Otherwise, a warning subroutine is called in step 250.

Figure 30:
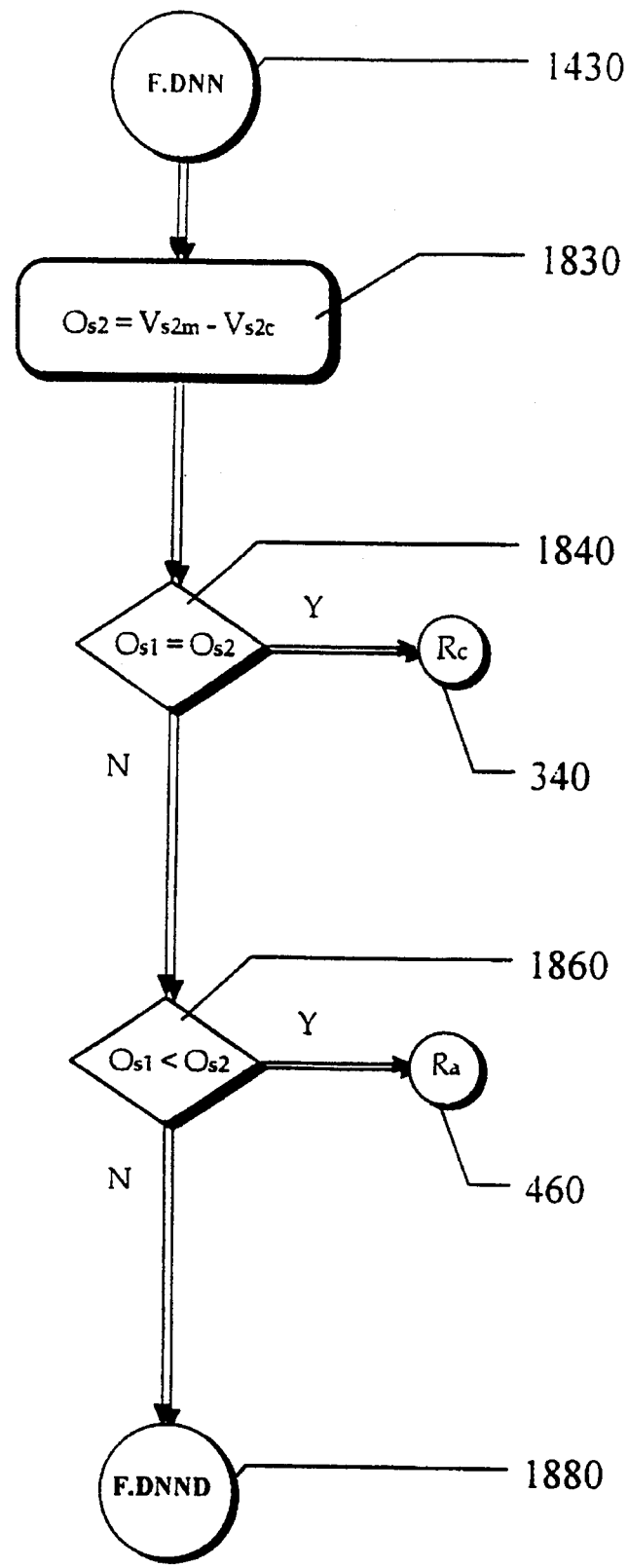

The subroutine called in step 1430 (FIG. 22) and illustrated in FIG. 30 begins by determining the distance moved by the object during a time interval (step 1830) and comparing the distance with a previously stored distance. If the distances are equal, as determined in step 1840, then the object is moving with constant velocity and, since the object has previously been determined to be moving towards the host vehicle, a warning subroutine is called (step 340). If the object is accelerating towards the host vehicle, as determined by step 1860, then another warning subroutine is called by step 460, while if the object is decelerating, then a subroutine for checking stopping distances is called in step 1880.

Figure 31:
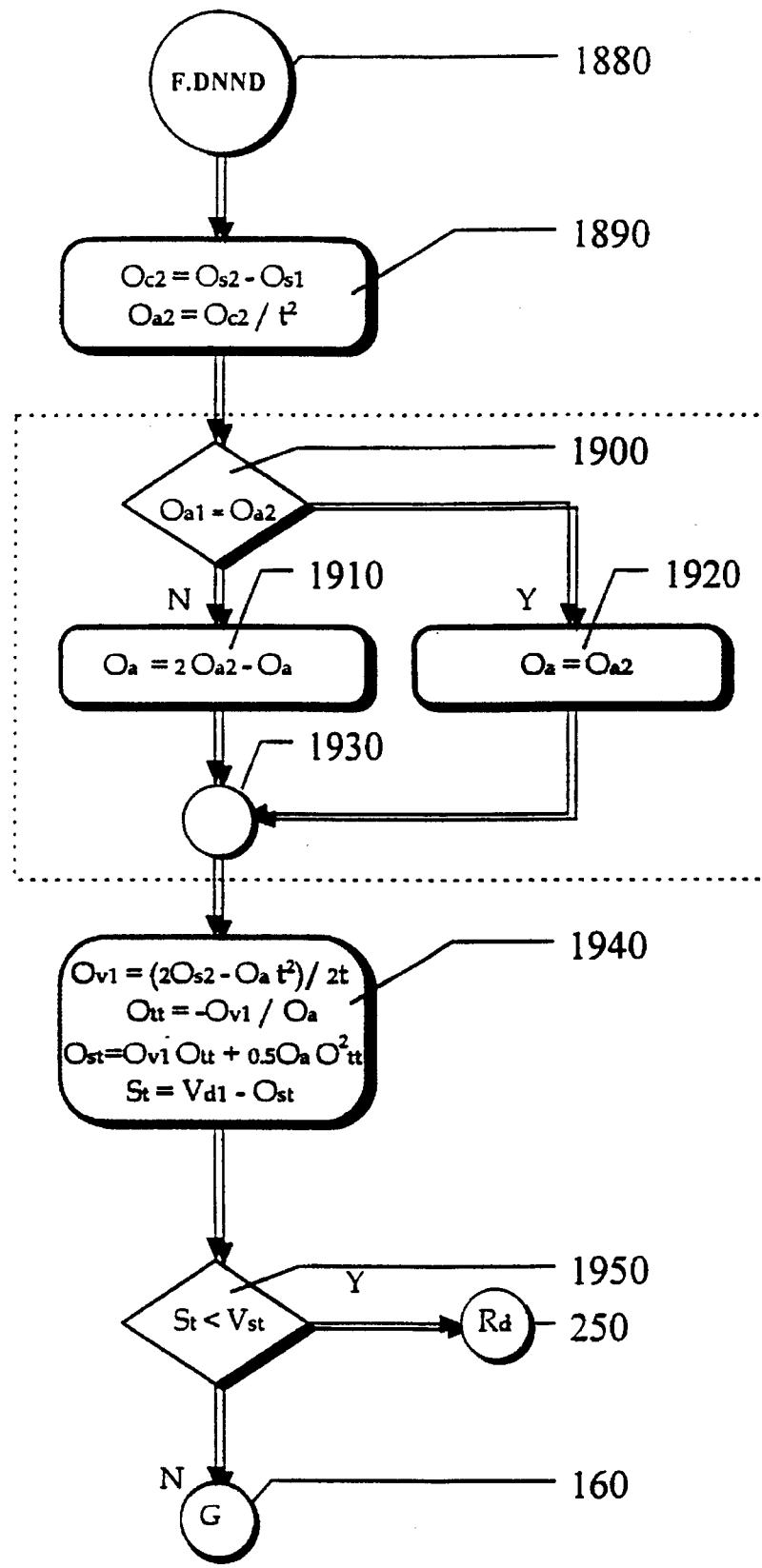

The subroutine called by step 1880 and illustrated in FIG. 31 uses the steps first described in connection with FIG. 8 for determining the object average acceleration (steps 1890–1930) and then calculates the stopping distance of the object and the relative distance between the object and the host vehicle (step 1940) and compares the result with the stopping distance of the host vehicle (step 1950) to determine whether the warning subroutine or the green light subroutine should be called (steps 160 or 250).

As a result of the above-described procedures, the preferred apparatus is capable of determining the distance from the host vehicle to any object detected, its velocity, and its acceleration, based solely on the input from a distance sensor and on host vehicle velocity. From this information, the apparatus extrapolates the positions of the host vehicle and the object to determine whether, if the velocity and acceleration remain the same, the paths of the host vehicle and object will cross, at which time there would be a collision. Using a presently available controller technology, the necessary determinations can be continually updated in real time, and an appropriate warning given or other action taken as necessary. Appropriate warning subroutines are described in the next section, but those skilled in the art will appreciate that the signals output by the controller can be used for a variety of different purposes related to collision warning and avoidance. Because the calculations necessary are relatively simple, involving non-iterative formulas and comparisons, it is anticipated that a high degree of redundancy can be built into the system at a relatively low cost.

Warning Signal Generation Subroutines

As is apparent from the above description, there are preferably five different status or alarm signal generating subroutines. The first is used when there is no danger of collision, while the remaining four involve various additional checks appropriate to the degree of danger presented by the situations in which they are called, in order to determine whether the possibility of a collision is sufficient great or imminent to require calling an additional subroutine for activating a safety device.

Figure 32:
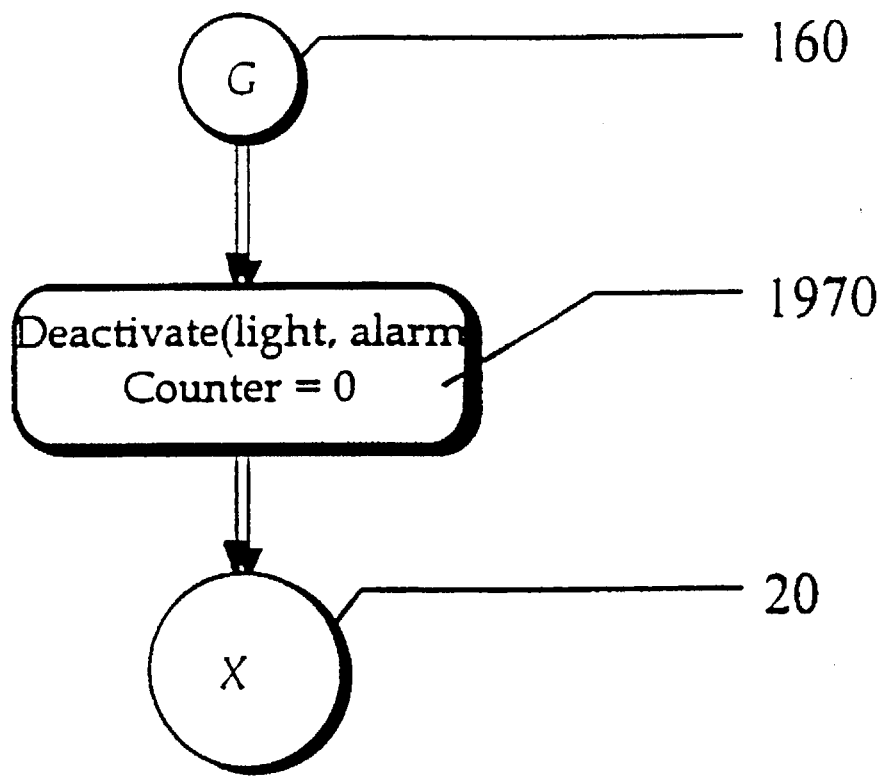

The first signal generating subroutine, shown in FIG. 32, generates what has heretofore been referred to as the green light or safe indication signal. It is called whenever conditions are such that, if the conditions do not change, no collision will occur. The subroutine, in the illustrated embodiment, deactivates all warning lights and any audio alarms, and resets a counter shared by all of the alarm subroutines described below (step 1970) before returning back to the main processing loop at step 20.

Figure 33:
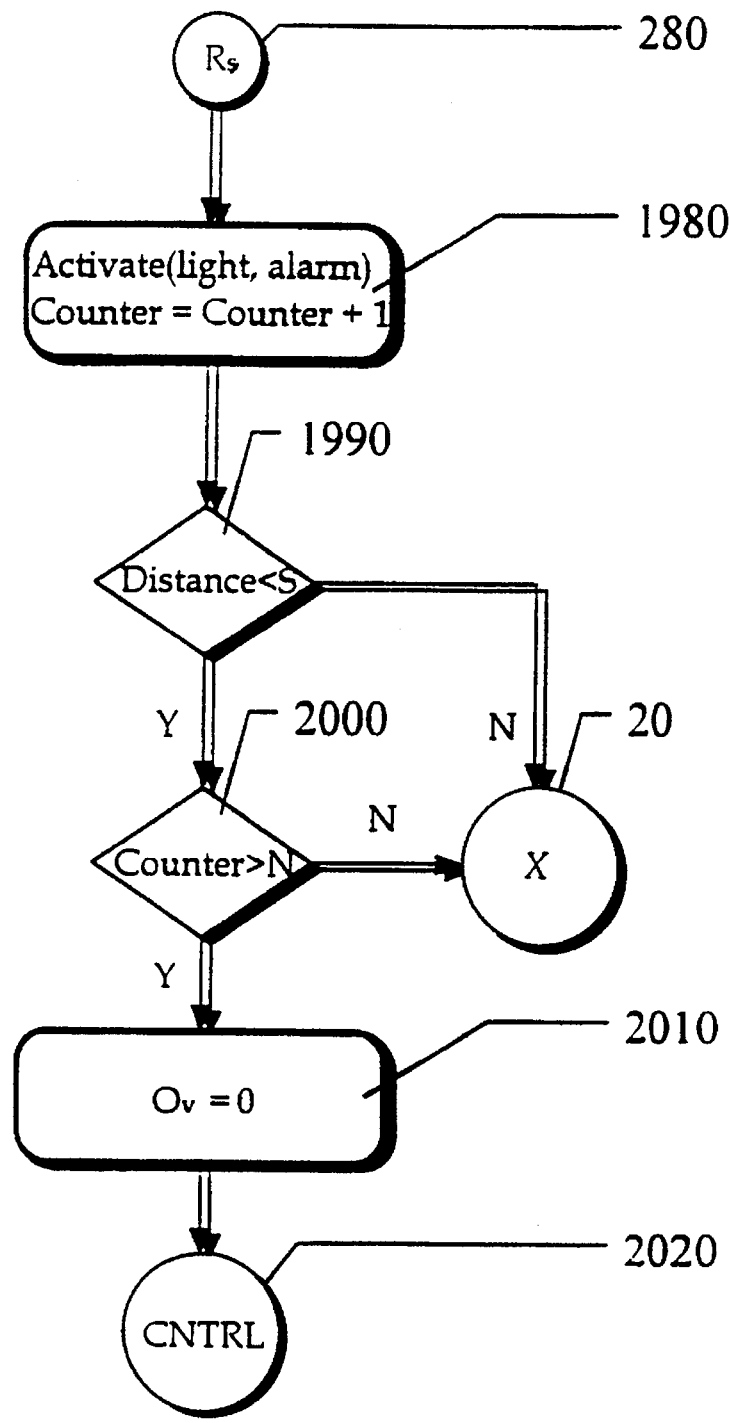

The first warning signal generating subroutine, shown in FIG. 33, is the $R_s$ signal generating subroutine, which is called when there is a possibility for an accident and the object is not moving. After activating a warning light and/or sounding an alarm, and increasing the counter by 1 (step 1980), the distance between the vehicle and the object is re-checked and, if this distance is less than a threshold value (indicating that the object is very close) and the count is greater than a threshold count (indicating that the conditions which resulted in the alarm have has re-occurred a sufficient number of times to reject the possibility of a false alarm or transitory hazard) a control subroutine (described below and illustrated in FIG. 38) is called after setting the object velocity variable equal to zero.

Figure 34:
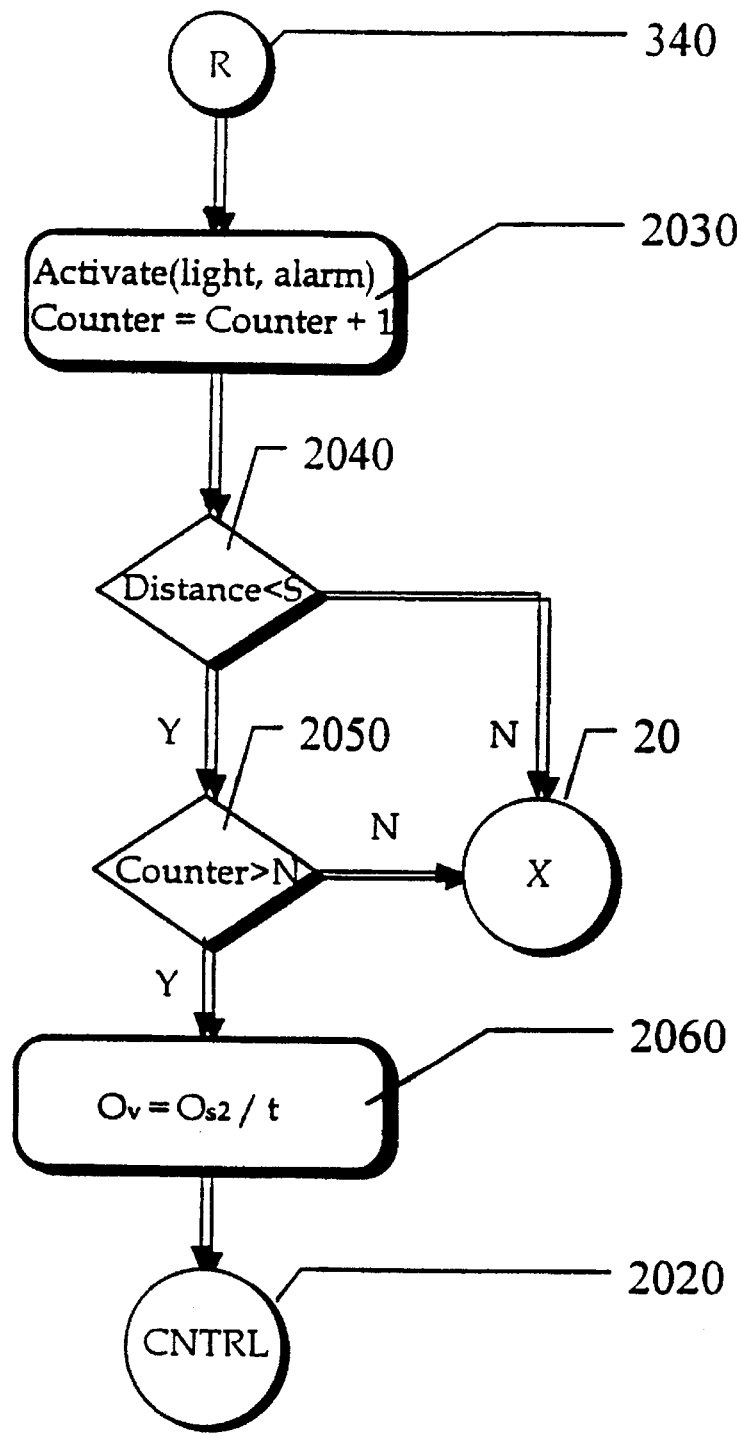

The next warning signal generating subroutine, illustrated in FIG. 34, generates a signal referred to by the label $R_c$ when the object is moving with a constant velocity and there is a possibility for an accident. This subroutine is identical to the R, subroutine, except that in step 2060, the object velocity variable is set to equal the distance moved by the object during the interval divided by the length of the interval for use in the CTRL subroutine 2020.

Figure 35:
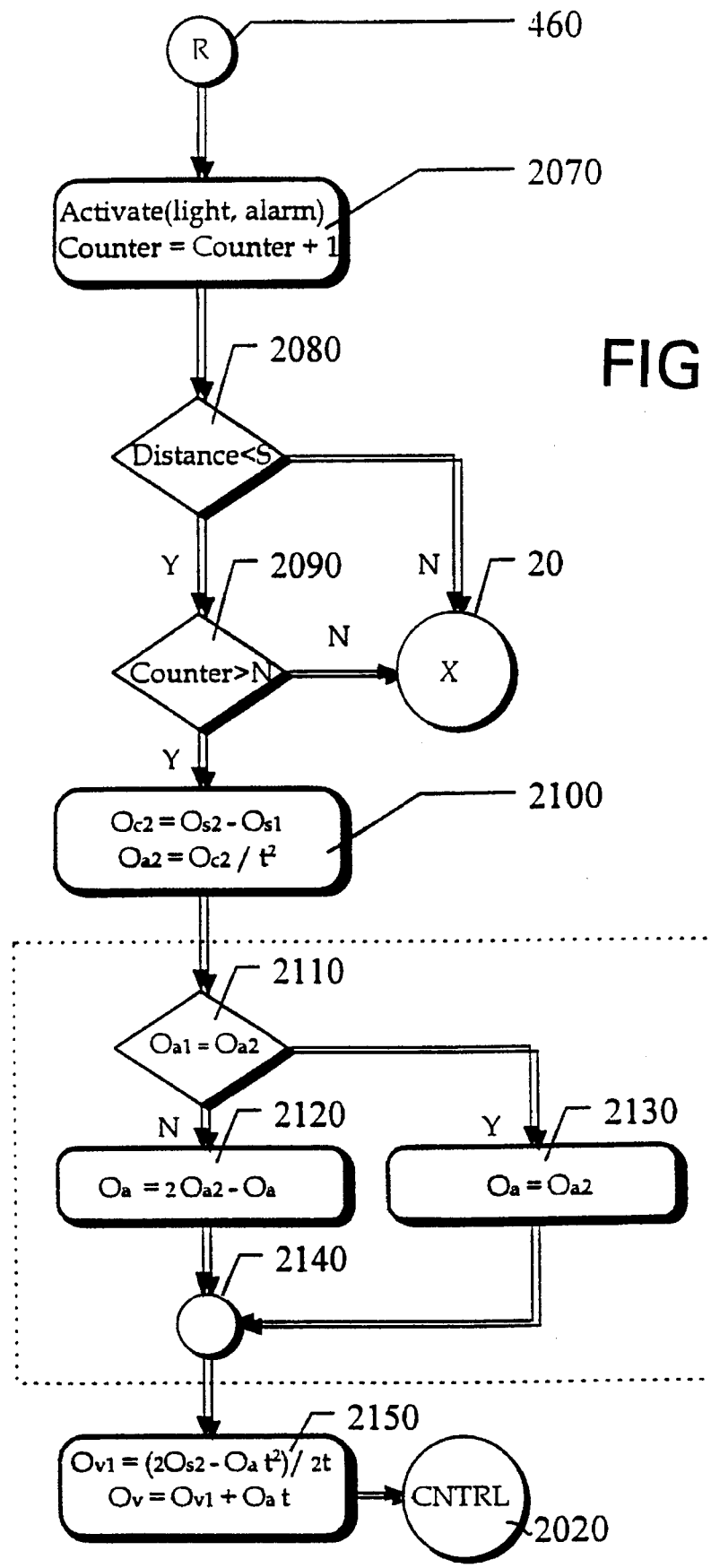

The $R_a$ subroutine shown in FIG. 35 is called when the object is accelerating (step 460) and involves the same thresholding procedure as the first two warning signal generating subroutines (steps 2070–2090), but then proceeds to recalculate the object acceleration and velocity (steps 2100–2150) for use by the CTRL subroutine 2020.

The $R_d$ subroutine shown in FIG. 36 is called when the object is decelerating (step 250) and there is a danger that a collision will occur. After thresholding of the relative object to host vehicle distance (step 2170) and number of iterations (steps 2160 and 2180), the object deceleration and velocity are recalculated (steps 2190–2240) for use in the CTRL subroutine 2020.

Figure 37:
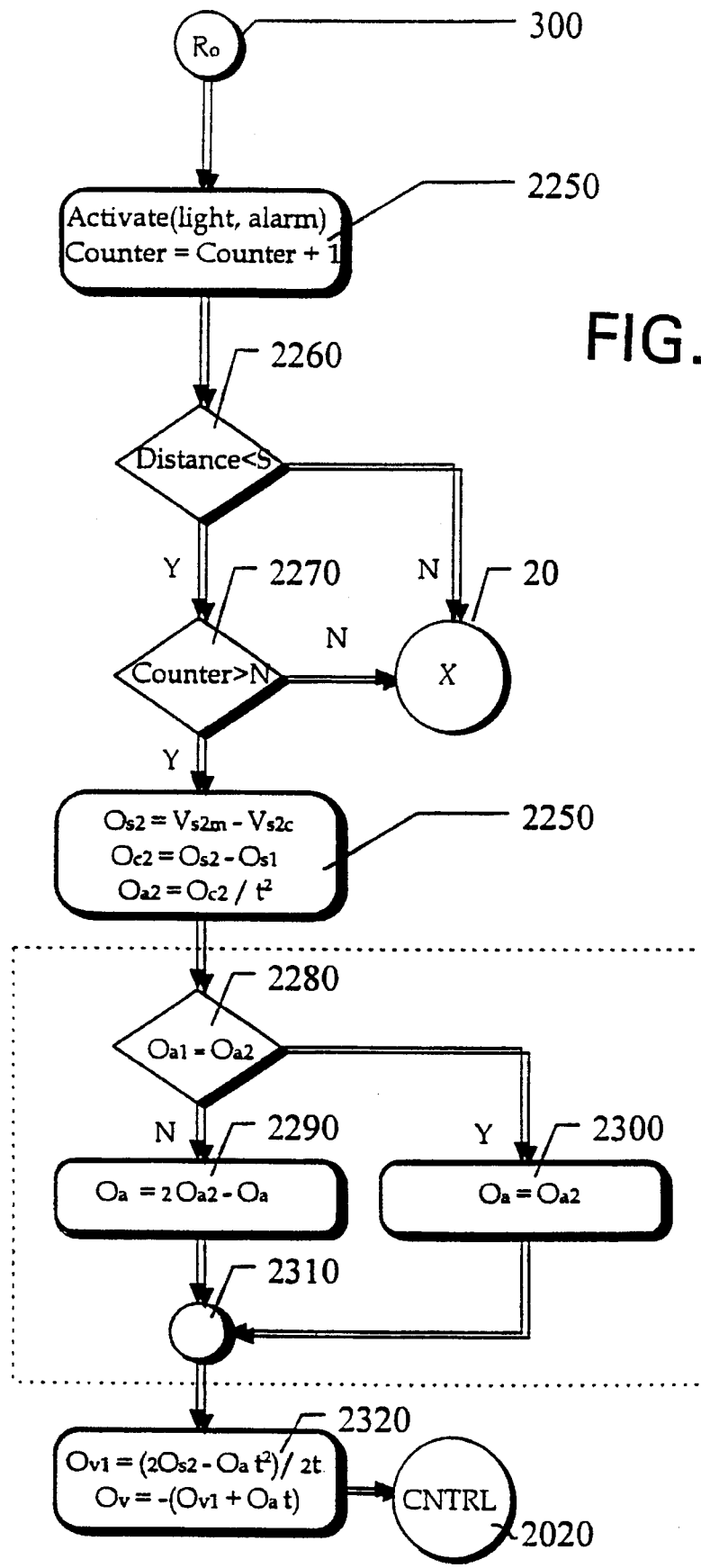

Finally, the $R_o$ signal generating subroutine called at step 300, as shown in FIG. 37, begins by activating the red light and alarm, increasing the counter, and finding out the object acceleration, if any. After thresholding the distances and time, the system calculates the object velocity resulting from the acceleration for use by the CTRL subroutine.

Figure 38:
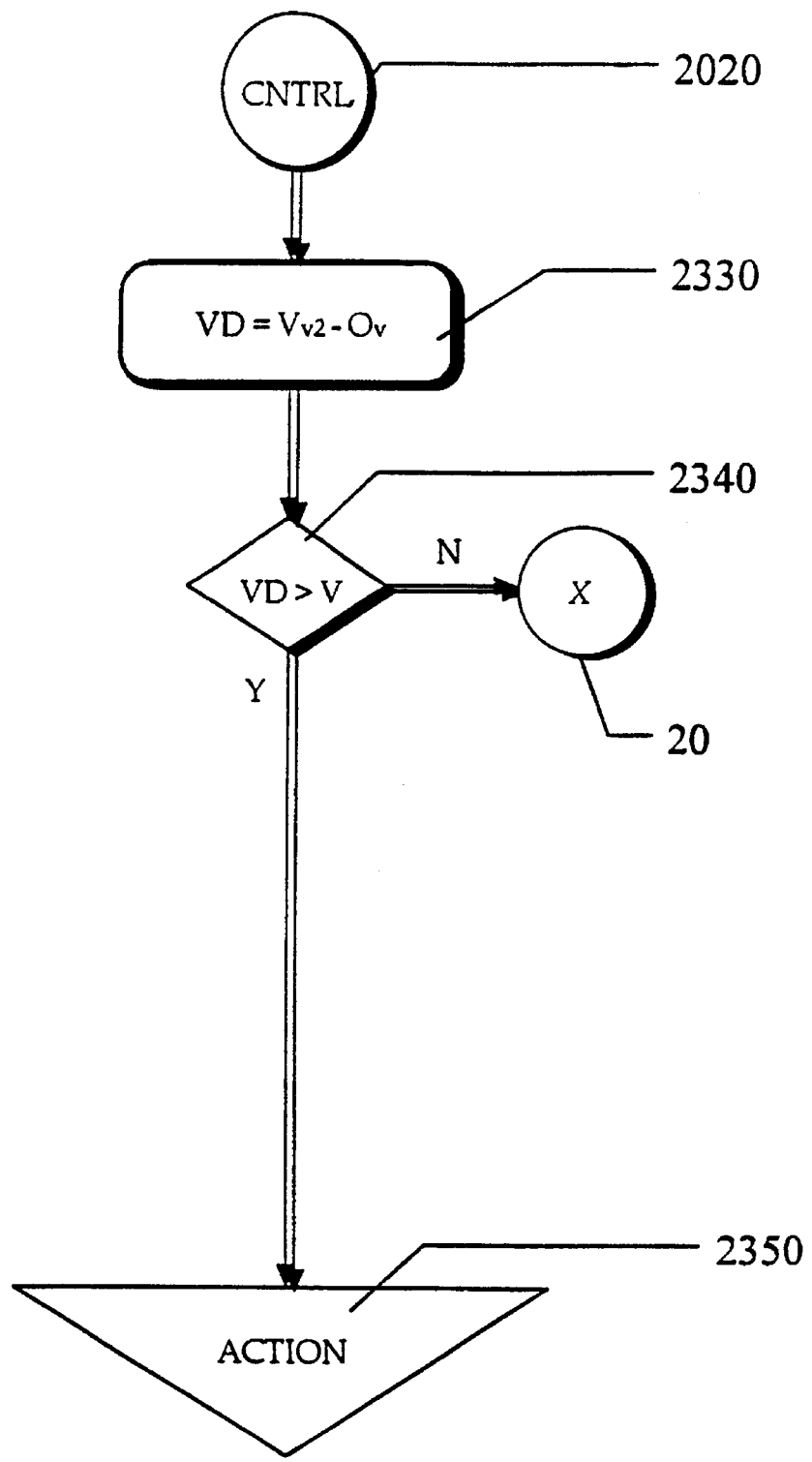

Activation of Safety Devices When a Collision is Imminent Despite the Warnings, Either Because of Operator Impairment or Sudden Changes in Status of the Object (The CTRL Subroutine This subroutine, illustrated in FIG. 38, enables the system to take further action. The first step, step 2330, is to compare the difference between the vehicle velocity and the object velocity. This difference is then thresholded because the relative speeds between the vehicles is a critical factor in the severity of the accident possible. If this difference is too great, then not only are the warning lights activated, but further action may be taken, such as the activation of safety devices including release of hydraulic bumper arrangements, activation of safety devices to protect persons in the vehicle, and so forth.

Those skilled in the art will appreciate that while a specific embodiment has been described in sufficient detail to enable those skilled in the art to make and use the invention, variations and modifications of the illustrated embodiment will undoubtedly occur to those skilled in the art, and that the invention is intended to encompass all such variations and modifications which are not already known or obvious to those of ordinary skill in the art. Consequently, it is intended that the invention not be limited to the specific embodiment disclosed, but rather that it be limited solely by the appended claims in accordance with applicable rules of claim interpretation. However, it is also intended that the claims not be read as preempting any mathematical formulas or laws of nature and, thus, to the extent that interpretation of the claims in light of the specification is necessary to assure the reader that the invention does involve a specific apparatus and method of controlling that apparatus, such interpretation of the claims is invited in accordance with the rules of claim interpretation set forth for this purpose by the courts and controlling laws.

I claim:

1. Apparatus, comprising:

a distance sensor;

a host vehicle velocity sensor;

a controller connected to the distance sensor and the velocity sensor, wherein the controller includes means for receiving a velocity signal from the velocity sensor;

means for monitoring a status of the host vehicle based on the velocity signal, said means for monitoring a status the host vehicle including means for determining whether the vehicle is:

(1) moving with constant velocity, (2) moving with acceleration, (3) moving with deceleration, or (4) not moving; and means for assessing a status of object, said means for assessing a status of the object including means for determining, based on the distance and velocity signals and on the previously determined status of the host vehicle, at least one of the following about the object:

(1) a direction in which the object is moving, (2) whether the object is moving with constant velocity, (3) the magnitude of the velocity of the object, (4) whether the object is moving with acceleration or deceleration, (5) the magnitude of the acceleration or deceleration of the object, and (6) whether the object is not moving; and means for generating an output signal representative of the probability that a collision will occur between the host vehicle and the object; and an alarm which is activated upon generation of an output signal by said controller when a collision is likely to occur between the host vehicle and the object.

2. A device as claimed in claim 1, further comprising an analog-to-digital converter connected between the distance and velocity sensors and the controller.

3. A device as claimed in claim 1, wherein the controller includes a memory for storing input signals from said distance and velocity sensors, and intermediate signals which represent the status of the host vehicle and of the object, for use during generation of said output signal.

4. A device as claimed in claim 1, wherein the alarm is selected from a group consisting of warning lights, a warning sound, and a combined warning light and sound.

5. A device as claimed in claim 1, further comprising means for determining a severity of said collision which is likely to occur and for activating additional safety devices in the event that a severe collision is imminent.

6. A device as claimed in claim 5, wherein the means for determining the severity of a collision includes means for comparing a velocity of the host vehicle with a velocity of the object, and determining that the collision will be severe if a difference between the host vehicle velocity and the velocity of the object exceeds a threshold distance.

7. A device as claimed in claim 1, wherein the means for generating an output signal further includes means for, when the host vehicle is stationary, checking a distance moved by the object during successive time intervals to determine whether the object is moving towards the host vehicle with either deceleration, acceleration, or constant velocity and, (a) if the object is moving towards the host vehicle with deceleration, calculating the amount of deceleration and from that a stopping distance and determining whether the object will stop, at the detected deceleration, in sufficient time to avoid colliding with the host vehicle, a warning signal being generated if the object will not stop in sufficient time, or (b) if the object is moving towards the host vehicle at a constant velocity or with acceleration, immediately generating a warning signal.

8. A device as claimed in claim 1, wherein the means for generating an output signal further includes means for, when the host vehicle is moving at a constant velocity, first determining whether the distance between the host vehicle and the object is increasing or decreasing and, (a) if a distance between the object and the host vehicle is decreasing, generating a warning signal, (b) if the distance between the host vehicle and the object is increasing, determining whether the object is moving at a constant velocity, accelerating, or decelerating, and (i) if the object is moving with a constant velocity, determining whether the velocity of the object is less than the velocity of the host vehicle, in which case a warning signal is generated, (ii) if the object is accelerating, determining the time the object will take to exceed the velocity of the host vehicle and the amount by which the relative distance between the host vehicle and object will change during the time interval and generating a warning signal if the amount by which the relative distance will change is greater than an initial current relative distance measured by the distance sensor, (iii) if the object is decelerating, immediately generating a warning signal.

9. A device as claimed in claim 1, wherein the means for generating an output signal further includes means for, when the host vehicle is accelerating, determining whether the object is accelerating an amount which is sufficient to cause the object to attain the same velocity as the host vehicle before the relative distance between the host vehicle and object reduces to zero, and generating a warning signal in all cases where the object is not accelerating by an amount sufficient to attain the host vehicle velocity before the relative distance reduces to zero.

10. A device as claimed in claim 1, wherein the means for generating an output signal further includes means for, when the host vehicle is decelerating, determining whether the object is (a) decelerating towards the host vehicle, (b) decelerating in the same direction as the host vehicle, (c) moving with constant velocity in the same direction as the host vehicle, or (d) accelerating in the same direction as the host vehicle and, in situations (a) and (b), determining the host vehicle stopping distance and comparing the host vehicle stopping distance with the amount by which the relative distance between the host vehicle during the time it takes the host vehicle to stop, in situation (c), determining a change in relative distance which will occur during the time it takes for the host vehicle to decelerate to a velocity which is less than that of the object, and in situation (d), determining the change in relative distance which will occur during the time it will take for the object to exceed the host vehicle velocity and, if the change in relative distance in any situations (a)–(d) is greater than the last relative distance measured by the distance sensor, generating a warning signal.

11. Apparatus for predicting a probability that an object will collide with a host vehicle in which the apparatus is situated, comprising:

distance measurement means for taking repeated measurements of a distance between the host vehicle and the object;

host vehicle velocity measurement means for taking repeated measurements of the host vehicle velocity;

host vehicle and object velocity, acceleration, and relative distance determining means connected to the distance measurement means and the host vehicle velocity measurement means for, between measurements, determining values for the host vehicle and object acceleration, velocity, and relative distance, the determination assuming that the host vehicle and object status will not change during a measurement interval, means connected to the host vehicle and object velocity, acceleration, and relative distance determining means for generating an output signal based on said determination during each measurement interval.

12. Apparatus as claimed in claim 11, further comprising an analog-to-digital converter connected between the measurement taking means and the means for determining values for the host vehicle and object.

13. Apparatus as claimed in claim 11, wherein the means for determining values for the host vehicle and the object includes a controller which in turn includes a memory for storing input signals from the measurement taking means and, as necessary, intermediate signals which represent the host vehicle acceleration and the object velocity and acceleration, for use during generation of said output signal.

14. Apparatus as claimed in claim 11, further comprising means for determining a severity of a collision which is likely to occur and for activating additional safety devices in the event that a severe collision is imminent.

15. Apparatus as claimed in claim 14, wherein the means for determining a severity of a collision includes means for comparing a velocity of the host vehicle with a velocity of the object, and determining that the collision will be severe if a difference between the host vehicle velocity and the velocity of the object exceeds a threshold difference, and wherein the means for determining whether the collision is imminent includes means for determining whether the distance between the object and the host vehicle is less than a predetermined minimum distance, a counter arranged to increment during successive iterations in which a collision danger is found, and and means for checking the counter to determine whether a count of successive iterations in which a collision danger is found exceeds a predetermined minimum count.

16. A method of controlling an electrical device, comprising the steps of:

measuring a distance between a host vehicle in which the device is situated and an object detected by the device and generating a signal representative thereof;

measuring a velocity of the host vehicle and generating a signal representative thereof;

monitoring a status of the host vehicle by processing the velocity signal to determine whether the vehicle is:

(1) moving with constant velocity,
(2) moving with acceleration,
(3) moving with deceleration, or
(4) not moving;

assessing a status of the object by processing the distance and velocity signals based on the previously determined status of the host vehicle to determine at least one of the following about the object:
(1) a direction in which the object is moving,
(2) whether the object is moving with constant velocity,
(3) a magnitude of the velocity of the object,
(4) whether the object is moving with acceleration or deceleration,
(5) a magnitude of the acceleration or deceleration of the object, and
(6) whether the object is not moving;

generating an output signal representative of the probability that a collision will occur between the host vehicle and the object; and activating an alarm upon the generation of an output signal by said controller when a collision is likely to occur between the host vehicle and the object.

17. A method as claimed in claim 16, further comprising the step of determining a severity of a collision which is likely to occur and for activating additional safety devices in the event that a severe collision is imminent.

18. A method as claimed in claim 17, wherein the step of determining a severity of a collision includes the step of comparing a velocity of the host vehicle with a velocity of the object, and determining that the collision will be severe if a difference between the host vehicle velocity and the velocity of the object exceeds a threshold distance.

19. A method as claimed in claim 16, wherein the step of generating an output signal further includes the step of, when the host vehicle is stationary, checking the distance moved by the object during successive time intervals to determine whether the object is moving towards the host vehicle with either deceleration, acceleration, or constant velocity and, (a) if the object is moving towards the host vehicle with deceleration, calculating the amount of deceleration and from that a stopping distance and determining whether the object will stop, at the detected deceleration, in sufficient time to avoid colliding with the host vehicle, a warning signal being generated if the object will not stop in sufficient time, or (b) if the object is moving towards the host vehicle at a constant velocity or with acceleration, immediately generating a warning signal.

20. A method as claimed in claim 16, wherein the step of generating an output signal further includes the step of, when the host vehicle is moving at a constant velocity, first determining whether the distance between the host vehicle and the object is increasing or decreasing and, (a) if the distance between the object and the host vehicle is decreasing, generating a warning signal, (b) if the distance between the host vehicle and the object is increasing, determining whether the object is moving at a constant velocity, accelerating, or decelerating, and (i) if the object is moving with a constant velocity, determining whether the velocity of the object is less than the velocity of the host vehicle, in which case a warning signal is generated, (ii) if the object is accelerating, determining the time the object will take to exceed the velocity of the host vehicle and the amount by which the relative distance between the host vehicle and object will change during the time interval and generating a warning signal if the amount by which the relative distance will change is greater than an initial current relative distance measured by the distance sensor, (iii) if the object is decelerating, immediately generating a warning signal.

21. A method as claimed in claim 16, wherein the step of generating an output signal further includes the step of, when the host vehicle is accelerating, determining whether the object is accelerating an amount which is sufficient to cause the object to attain the same velocity as the host vehicle before the relative distance between the host vehicle and object reduces to zero, and generating a warning signal in all cases where the object is not accelerating by an amount sufficient to attain the host vehicle velocity before the relative distance reduces to zero.

22. A method as claimed in claim 16, wherein the step of generating an output signal further includes the step of, when the host vehicle is decelerating, determining whether the object is (a) decelerating towards the host vehicle, (b) decelerating in the same direction as the host vehicle, (c) moving with constant velocity in the same direction as the host vehicle, or (d) accelerating in the same direction as the host vehicle and, in situations (a) and (b), determining a host vehicle stopping distance and comparing the host vehicle stopping distance with an amount by which the relative distance between the host vehicle and the object changes during the time it takes the host vehicle to stop, in situation (c), determining a change in relative distance which will occur during the time it takes for the host vehicle to decelerate to a velocity which is less than that of the object, and in situation (d), determining a change in relative distance which will occur during the time it will take for the object to exceed the host vehicle velocity and, if the change in relative distance in any of situations (a)–(d) is greater than the last relative distance measured by the distance sensor, generating a warning signal.

* * * * *

UNITED STATES PATENT AND TRADEMARK OFFICE
CERTIFICATE OF CORRECTION

PATENT NO. : 5,594,414
DATED : January 14, 1997
INVENTOR(S) : Abdulatif NAMNGANI It is certified that error appears in the above-indentified patent and that said Letters Patent is hereby corrected as shown below:

Column 3, line 33, change "(3)" (second instance) to --(4)--.

Column 8, line 64, change "$a_2$" to --$a_v$--.

Column 10, line 14, delete "$V_{c2}$";
Column 10, line 22, insert --,-- after "vehicle";
Column 10, line 47, change "$V_{v2}$" to --$V_{v1}$--.

Column 12, line 31, change "increasing" to --decreasing--.

Column 19, line 22, change "R" to --$R_s$--.

In Fig. 17, element 250, "$R_d$" should have a circle around it.

In Fig. 34, element 340, change "R" to --$R_d$--.

UNITED STATES PATENT AND TRADEMARK OFFICE
CERTIFICATE OF CORRECTION

PATENT NO. : 5,594,414
DATED : January 14, 1997
INVENTOR(S) : Abdulatif NAMNGANI It is certified that error appears in the above-indentified patent and that said Letters Patent is hereby corrected as shown below:

In Fig. 35, element 460, change "R" to --$R_-$--.

Signed and Sealed this

Fifteenth Day of July, 1997

Attest:

BRUCE LEHMAN

Attesting Officer

Commissioner of Patents and Trademarks